US007004093B2

(12) United States Patent
Loui et al.

(10) Patent No.: US 7,004,093 B2
(45) Date of Patent: Feb. 28, 2006

(54) LOW DRAG SUBMERGED ASYMMETRIC DISPLACEMENT LIFTING BODY

(75) Inventors: Steven Loui, Honolulu, HI (US); Gary Shimozono, Kapolei, HI (US); Troy Keipper, Honolulu, HI (US)

(73) Assignee: Navatek, Ltd., Honolulu, HI (US)

( * ) Notice: Subject to any disclaimer, the term of this patent is extended or adjusted under 35 U.S.C. 154(b) by 0 days.

(21) Appl. No.: 10/834,930

(22) Filed: Apr. 30, 2004

(65) Prior Publication Data

US 2005/0178310 A1 Aug. 18, 2005

Related U.S. Application Data

(60) Provisional application No. 60/466,787, filed on May 1, 2003.

(51) Int. Cl.
*B63B 1/00* (2006.01)

(52) U.S. Cl. ...................................... 114/61.3; 114/274

(58) Field of Classification Search ............... 114/61.3, 114/274

See application file for complete search history.

(56) References Cited

U.S. PATENT DOCUMENTS

| | | | | |
|---|---|---|---|---|
| 3,157,145 A | | 11/1964 | Farris | 114/332 |
| 3,347,197 A | | 10/1967 | Scherer | 114/66.5 |
| 3,429,287 A | | 2/1969 | Uram | 114/278 |
| 3,885,514 A | | 5/1975 | Lauenborg | 114/228 |
| 3,947,906 A | | 4/1976 | McLane | 114/332 |
| 4,819,576 A | | 4/1989 | Shaw | 114/274 |
| 4,919,063 A | | 4/1990 | Hall | 114/61.14 |
| 4,981,099 A | | 1/1991 | Holder | 114/274 |
| 5,046,444 A | * | 9/1991 | Vorus | 114/274 |
| 5,433,161 A | | 7/1995 | Loui | 114/61.14 |
| 5,477,798 A | | 12/1995 | Ness | 114/65 R |
| 5,522,333 A | | 6/1996 | Lang | 114/61.12 |
| 5,544,610 A | | 8/1996 | Harding | 114/312 |
| 5,645,008 A | * | 7/1997 | Loui | 114/274 |
| 5,794,558 A | | 8/1998 | Loui | 114/274 |
| 6,263,819 B1 | * | 7/2001 | Gorustein et al. | 114/61.3 |

* cited by examiner

*Primary Examiner*—Lars A. Olson
(74) *Attorney, Agent, or Firm*—Fitzpatrick, Cella, Harper & Scinto

(57) ABSTRACT

Low drag underwater submerged lifting bodies which can be used as underwater displacement portions of a vessel whose main hull is at sea level are asymmetrical and have improved lift to drag ratios. The lifting bodies have outer surfaces whose shapes are defined in plan and elevation by generally parabolic curves which are different on opposite sides of the lifting bodies.

101 Claims, 13 Drawing Sheets

LOW DRAG SUBMERGED ASYMMETRIC DISPLACEMENT LIFTING BODY

This application claims the benefit of U.S. Provisional Application No. 60/466,787, filed May 1, 2003.

BACKGROUND OF THE INVENTION

1. Field of the Invention

The present invention relates to ships and watercrafts having improved efficiency and seakeeping from underwater submerged displacement hull(s) attached to and part of a vessel that operates at sea level.

2. Background of the Invention

In recent years interest in the use of small waterplane area ships (SWAS vessels) has substantially increased because such vessels have improved hydrodynamic stability, low water resistance and minimal ship motion. Generally such vessels have at least one waterline located below its design draft with a waterplane area that is significantly larger than the waterplane area at its design draft. One form of such vessel is known as a small waterplane area twin hull vessel (a SWATH vessel) which generally consists of two submerged hulls, originally formed of uniform cross-section, connected to a work platform or upper hull by elongated struts which have a cross-sectional area along any given waterplane area that is substantially smaller than a waterplane area cross-section of the submerged hulls. Thus, at the design waterline such vessels have a small waterplane area.

The interest in such vessels has increased in large part because of the development work conducted by Pacific Marine Supply Co., Ltd. A variety of such vessels have been produced using twin submerged hulls or a plurality of submerged hulls, such as shown, for example, in U.S. Pat. No. 5,433,161. In the course of the development work for these vessels, further improvements were made and a so-called Mid-Foil SWAS vessel was developed, as disclosed in U.S. Pat. No. 5,794,558. Such vessels use a submerged underwater displacement hull or lifting body to provide lift to the craft in conjunction with any other parts of the vessel which generate lift. The lifting body differs from a hydrofoil in that the enclosed volume of the lifting body provides significant displacement or buoyant lift as well as hydrodynamic lift whereas the lift of a hydrofoil is dominated by only hydrodynamic lift. In the course of continuing development work, the particular shape of such lifting bodies was studied in detail in order to improve their performance and adapt and integrate their use to a wide range of marine craft.

More specifically, as disclosed in U.S. Pat. No. 6,263,819, it was found that the submerged bodies of marine vessels, when operated at shallow submergence depths, such as is the case for SWAS and Mid-Foil vessels, can be adversely effected by the displacement of the free water surface caused by the body's volume and dynamic flow effects. The interaction of that displacement of the free surface relative to the body's shape had not been adequately accounted for in the prior art structures. It is believed that this inadequacy of existing prior art submerged bodies for marine vessels is the result of the fact that submerged and semi-submerged marine vessels have historically been designed to operate at great depths relative to their underwater body thickness, as with submarines or hydrofoils.

A typical submarine is essentially a body of revolution-shaped hull which has three dimensional waterflow about it, but which is designed to operate normally several hull diameters or more below the free water surface. Thus, the displacement of the free surface of the water by operation of the hull at such depths is minimal and does not effect the operation of the body. On the other hand, hydrofoils are simply submerged wings with predominately two-dimensional flow and are designed typically to produce dynamic lift as opposed to buoyant or hydrostatic lift.

The displacement of water at the free surface by a submerged body is detrimental to a marine vessel's hydrodynamic performance with the impact varying as a function of the body's shape, submergence depth, speed and trim. For example, the free surface effects can significantly reduce lift in the body or even cause negative lift (also referred to as sinkage) to occur. Resistance to movement through the water by free surface effects is generally greater than if the submerged hull were operating at great depths; and pitch movements caused by the displacement of the free water surface vary with speed and create craft instability. With the advent in recent years of marine vehicles (such as the SWAS, SWATH, and Mid-Foil vessels) which use a shallowly submerged body the detrimental effects of free surface water displacement on submerged hulls has been recognized.

Prior to the invention as disclosed in U.S. Pat. No. 4,263,819, submerged displacement watercraft hull body shapes were generally cylindrical or tear-drop shaped bodies of revolution. The simplest variations are bodies with generally elliptical cross-sections, such as are shown, for example, in U.S. Pat. No. 4,919,063 or 5,433,161. Others were simply shaped in a manner similar to an airplane wing, as shown for example, in U.S. Pat. No. 3,347,197. On the other hand, hydrofoil dynamic lift shapes are generally thin-foils with little or no, buoyancy and symmetric foil sections having straight leading and trailing edges. In plan these foils are generally straight, or are swept forward or rearwardly and/or are trapezoidal in shape. Additionally, they can have dihedral or anhedral canting from the horizontal. It was found that the performance of vessels using these shapes is adversely effected by the displacement of the free surface of the water above the bodies during operation of the vessel.

According to teaching of U.S. Pat. No. 6,263,819 (hereinafter the "'819 patent"), a low drag underwater submerged displacement hull is defined from two parabolic shapes. The periphery of the hull when viewed in plan is symmetrical and defined by a first parabolic form (or parabolic equation) with the form defining the leading edge of the hull. The longitudinal cross-section of the hull is formed of foil shaped cross-sections which are defined as cambered parabolic foils having a low drag foil shape and providing a generally parabolic nose for the hull. Generally, each longitudinal cross-section of the hull parallel to the longitudinal or fore and aft axis of the hull has a symmetrical cambered parabolic foil shape with the cross-section along the longitudinal axis of the hull having the maximum thickness and the cross-section furthest from the centerline of the hull having the minimum thickness. In plan, the hull has a stern or trailing edge which is defined by either a straight line, a parabolic line, or a straight line fared near its ends to the side edges of the plan parabola shape.

In another embodiment the hull shape is a parabolic body of revolution. In a third embodiment the hull also has a foil shape in longitudinal cross-section which is essentially formed by a parabolic body of revolution cut in half and separated by a uniform midships section, whose longitudinal cross-sections are uniform in shape and correspond to the parabolic shape of the body of revolution.

These body shapes have benign pressure gradients and small stagnation points over the body which make the bodies less sensitive to changes in the body angle of attack relative to the flow so that they are less effected by free water surface disturbance. Parabolic foil embodiments have high Block coefficients which maximize their volume to surface area relationship with the result that they have less frictional drag because of reduced wetted surface area, less structure and thus less cost. With higher Block coefficients, such as the 60–70% coefficients achieved with the lifting bodies of the '819 patent, the volume of the foil relative to its surface area is maximized and, as a result, the foils provide greater buoyancy for the same surface area as compared to the prior art.

Because of their high Block coefficient, high displacements can be achieved with hulls having relatively short bodies. This allows these bodies to operate at high Froude numbers, preferably in excess of 1. This in turn results in less wave making drag and less friction drag from a thinner boundary layer. Wakes formed by these bodies are very uniform and result in minimal disturbance beyond the trailing edge to appendages bodies, or propulsers positioned at the trailing edge or stern. The symmetrical parabolic foils, at critical design submergence depths, displace the free surface of the water in a manner which reduces the pressure coefficient on the bodies and allow higher incipient cavitation speeds. Their dynamic lift can then be varied as a function of camber (i.e. variation of the surface location from the design parabola), submergence, speed and angle of attack. As a result, optimization of lift characteristics for a given craft design speed and draft can be achieved. Further, dynamic lift of these bodies can be varied by the use of integrated trailing edge flaps, which will mitigate appendage drag of non-integral foil stabilizers.

It has been found that the symmetric lifting bodies of the '819 patent operate very satisfactorily for most applications, even for very large vessels of 2000 tons and up. However, it is advantageous to have lifting bodies which are smaller relative to the length of the ship and capable of being positioned outboard of the watercraft hull. Therefore, further development of the lifting bodies of the '819 patent has occurred, particularly for use with monohull vessels.

The symmetrical lifting bodies as disclosed in the '819 patent were primarily used generally directly under the hull. However, if the lifting body is located further from the center of gravity of the ship, it not only can provide lift but greater dynamic control as a result of maximizing dynamic moment. In addition, it has been found useful to tailor the shape of the lifting body to conform to the hull it is used with as well as to accommodate flows under the hull caused by the hull or other underwater structures. It also has been found that while large monohull vessels have very good seakeeping ability, the use of the tailored asymmetric lifting bodies of the present invention with such hulls greatly increase their seakeeping abilities.

It is an object of the present invention to provide a submerged lifting body which can be employed on various marine vessels to maximize performance of the vessel by creating a high lift to drag ratio (L/D), i.e., low drag, at operational speed, while increasing dynamic control.

Another object of the present invention is to provide a submerged lifting body for use on various marine vessels which improves performance of the vessel at operational speed while creating a dynamically stable vessel.

Yet another object of the present invention is to provide submerged lifting bodies for use on various marine vessels which can increase the efficiency of these vessels by reducing hydrodynamic drag.

A further object of the present invention is to adapt these improved submerged lifting bodies to a variety of watercraft (monohulls, catamarans, trimarans, swath, semi-swath, planing and displacement vessels) by optimizing their shape, size, number and location.

Another object of the present invention is to provide submerged lifting bodies for use on various marine vessels that are shaped to reduce the possibility of being damaged when docking or coming alongside another structure.

Yet another object of the present invention is to provide submerged lifting bodies for use on various massive vessels that reduce the wave making and slamming of a vessel.

Yet another object of the present invention is to provide submerged lifting bodies for use on various marine vessels that improve the seakeeping by reducing the vessel's motions while at rest as well as while underway.

Still another object of the invention is to provide submerged lifting bodies for use on various marine vessels that are shaped to result in improved flow to an integrated propulsor yielding high propulsive efficiency.

SUMMARY OF THE INVENTION

In accordance with an aspect of the present invention, an underwater lifting body is provided that meets these objectives. Briefly, off vessel centerline mounted lifting bodies are disclosed whose shape has been tailored to the flow at its location to optimize the performance of the body. In cross-section, the lifting body is parabolic foil shaped and in plan view there is no longitudinal plane of symmetry.

Generally, a three-dimensional low drag underwater lifting body for operation in a submerged state is provided which has a fore and aft axis and an outer surface whose shape conforms in plan on one side of the fore and aft axis to a first parabolic curve whose vertex is located on the fore and aft axis, and on the other side of the axis to a second different parabolic curve whose vertex is also located on the fore and aft axis. The parabolic curves together define a leading edge for the lifting body when viewed in plan. The outer surface of the lifting body also conforms, in longitudinal cross-sectional planes parallel to the fore and aft axis, to graduated generally parabolic foil curves having vertices lying on the leading edge defined by said first and second parabolic curves and which extend aft predetermined distances, with the thickness of the parabolic foil shaped longitudinal cross-sectional planes decreasing from the fore and aft axis of the lifting body to the leading edge of the lifting body.

In another aspect of the invention, the three dimensional low drag underwater lifting body for operation in a submerged state has a fore and aft axis and an outer surface whose shape conforms in plan on one side of said axis to a first parabolic curve whose vertex is located on the fore and aft axis, and on the other side of said axis to a second different parabolic curve whose vertex is also located on the fore and aft axis. These parabolic curves together define a leading edge for the hull when viewed in plan. The lifting body also conforms, in longitudinal cross-sectional planes parallel to the fore and aft axis, to graduated generally parabolic foil curves having vertices lying on the leading edge defined by said first and second parabolic curves and which extend aft predetermined distances, with the thickness of the parabolic foil shaped longitudinal cross-sectional planes decreasing from the fore and aft axis of the lifting body to the leading edge of the lifting body. The lifting body has a bow and a stern and a predetermined length extending from the bow to the stern; the first parabolic curve increases in width from said bow to stern with the stern being defined by the segment of a third parabolic curve transverse to the lifting body's length extending from the widest portion of the first parabolic curve to said axis.

In yet another aspect of the present invention, a watercraft includes a first hull having a surface waterline, at least one strut depending from the hull and a three-dimensional underwater submerged lifting body secured to the strut beneath the waterline during operation of the watercraft. The lifting body has a fore and aft axis and an outer surface whose shape conforms in plan on one side of the fore and aft axis to a first parabolic curve whose vertex is located on the fore and aft axis, and on the other side of said axis to a second different parabolic curve whose vertex is also located on the fore and aft axis. The parabolic curves together defining a leading edge for the hull when viewed in plan. The lifting body also conforms in longitudinal cross-sectional planes parallel to the fore and aft axis, to graduated generally parabolic foil curves having vertices lying on the leading edge defined by said first and second parabolic curves and which extend aft predetermined distances, with the thickness of the parabolic foil shaped longitudinal cross-sectional planes decreasing from the fore and aft axis of the lifting body to the leading edge of the lifting body.

In further aspect of the invention, a watercraft includes a first hull having a surface waterline, at least one strut depending from the first hull and a three-dimensional underwater submerged lifting body secured to the strut beneath the waterline during operation of the watercraft. The lifting body has a fore and aft axis and an outer surface whose shape conforms in plan on one side of the axis to a first parabolic curve whose vertex is located on the fore and aft axis, and on the other side of said axis to a second different parabolic curve whose vertex is also located on the fore and aft axis. The parabolic curves together define a leading edge for the hull when viewed in plan. The lifting body also conforms, in longitudinal cross-sectional planes parallel to the fore and aft axis, to graduated generally parabolic foil curves having vertices lying on the leading edge defined by the first and second parabolic curves and which extend aft predetermined distances, with the thickness of the parabolic foil shaped longitudinal cross-sectional planes decreasing from the fore and aft axis of the lifting body to the leading edge of the lifting body. The lifting body also has a bow and a stern and a predetermined length extending from the bow to the stern. The first parabolic curve increases in width from said bow to the stern with the stern being defined by a segment of a third parabolic curve transverse to the lifting body's length and located at the widest portion of the first parabolic curve.

In accordance with a still further aspect of the invention, a watercraft includes a first hull having a surface waterline, at least one strut depending from the first hull and a three-dimensional underwater submerged lifting body secured to the strut beneath the waterline during operation of the watercraft. The lifting body has a fore and aft axis and an outer surface whose shape is defined by a leading edge for the lifting body when viewed in plan and, in longitudinal cross-section by symmetrical generally parabolic foil curves having vertices lying on the leading edge of the lifting body and lying in planes parallel to the fore and aft axis. The lifting body has first and second hull sections on opposite sides of the fore and aft axis and a midship section between the first and second hull sections and located to one side of the fore and aft axis. The first and second hull sections conforming in plan to first and second different parabolic curves whose vertexes are respectively located on and define a portion of the leading edge; the midship section having a parabolic foil shape in longitudinal cross-section which is uniform in planes parallel to the fore and aft axis between the first and second hull sections across the width thereof. The foil curves of the first and second hull sections decrease in thickness from the fore and aft axis of the lifting body to the edge thereof.

The lifting bodies of the present invention as described above are asymmetric about their main fore and aft axis. This permits the lifting bodies to be positioned relative to the hull of the ship to conform to the hull, to accommodate water flow characteristics below the hull caused by the hull's shape and to modify the angle of attack of the lifting body. For example, two lifting bodies can be secured to opposite sides of the hull so either of their asymmetric sides are adjacent to the ship's hull so as to present alternative leading edge configurations depending on the ship's hull shape.

By positioning the lifting bodies outboard of the hull, greater dynamic moment is created increasing dynamic control. On multihull vessels the lifting bodies may be placed both inboard and outboard.

The above, and other objects, features and advantages of this invention will be apparent to those skilled in the art from the following detailed description of illustrative embodiments of the invention which is to be read in connection with the accompanying drawings wherein:

Figure 15:
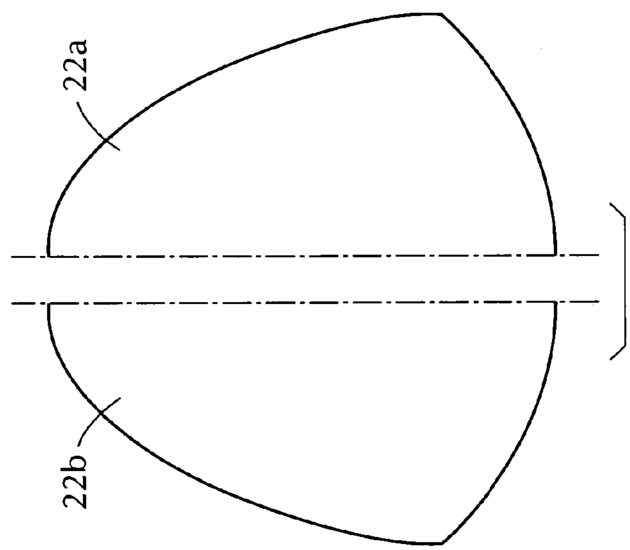
Figure 20A:
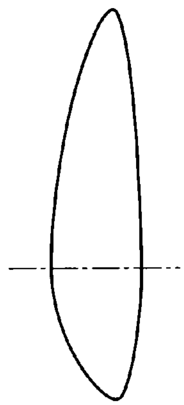
Figure 20:
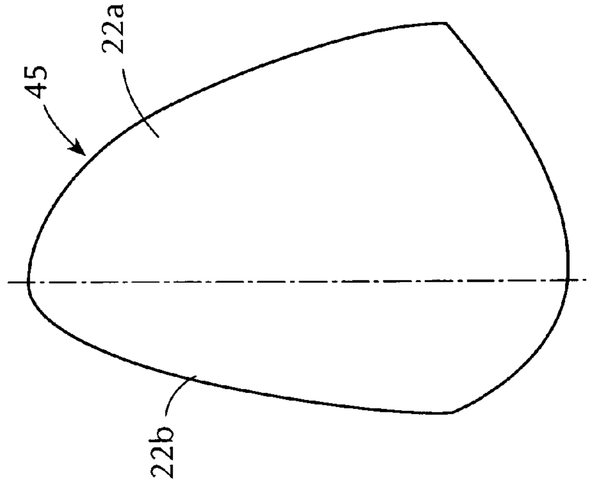
Figure 19A:
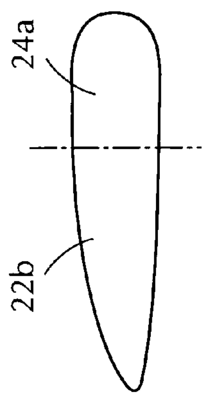
FIG. 19 is a plan view of an asymmetric lifting body constructed using the left half of the lifting body shown in FIGS. 12 and 15 and the right half of the lifting body shown in FIGS. 13 and 16.
Figure 19:
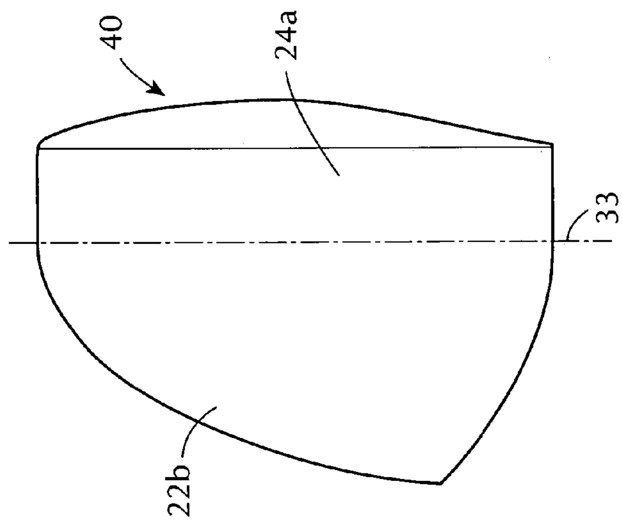
Figure 18:
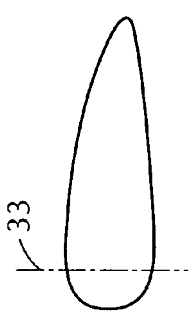
FIG. 18 is a front view of the asymmetric lifting body of FIG. 17.
Figure 17:
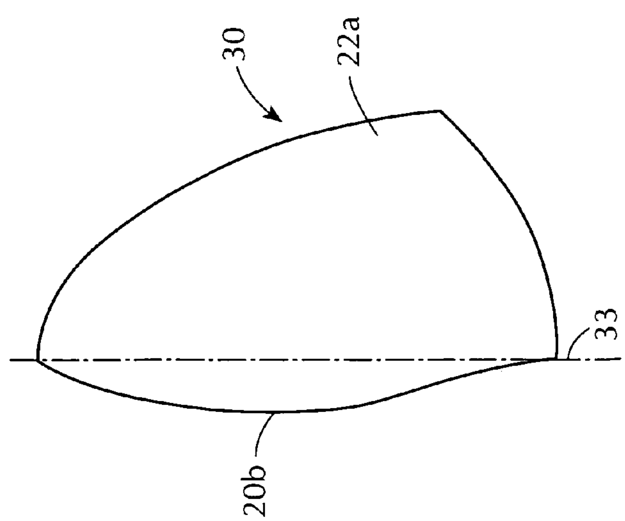
FIG. 17 is a plan view of an asymmetric lifting body constructed in accordance with the present invention using the left half of the lifting body as shown in FIGS. 11 and 14 and the right half of the lifting body shown in FIGS. 12 and 15.
Figure 22:
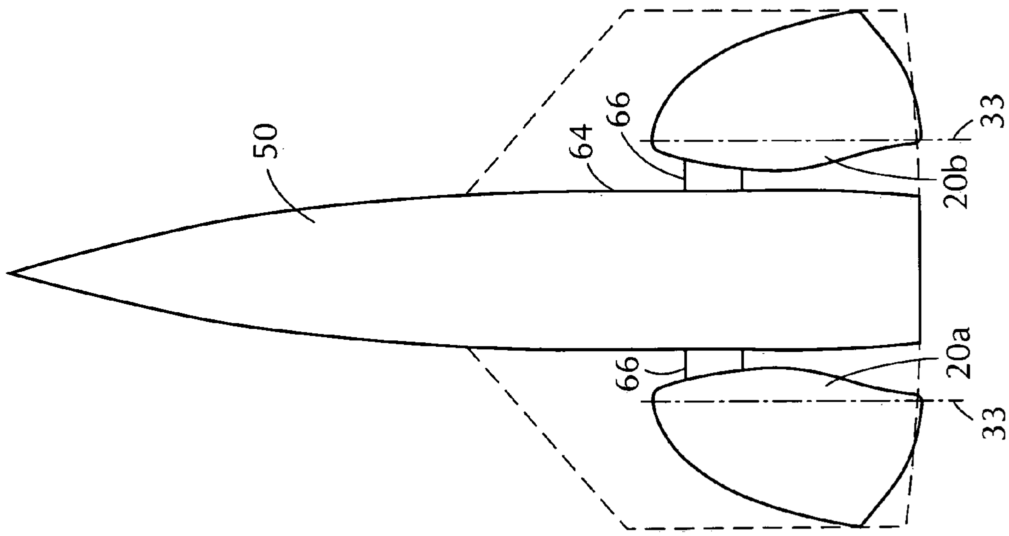
Figure 21:
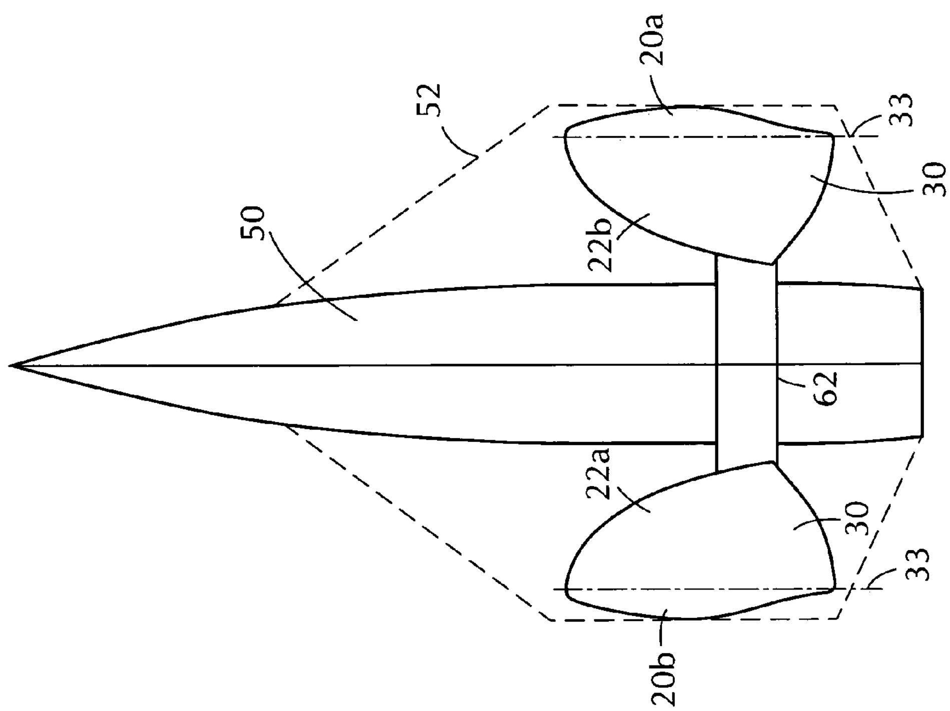
Figure 24:
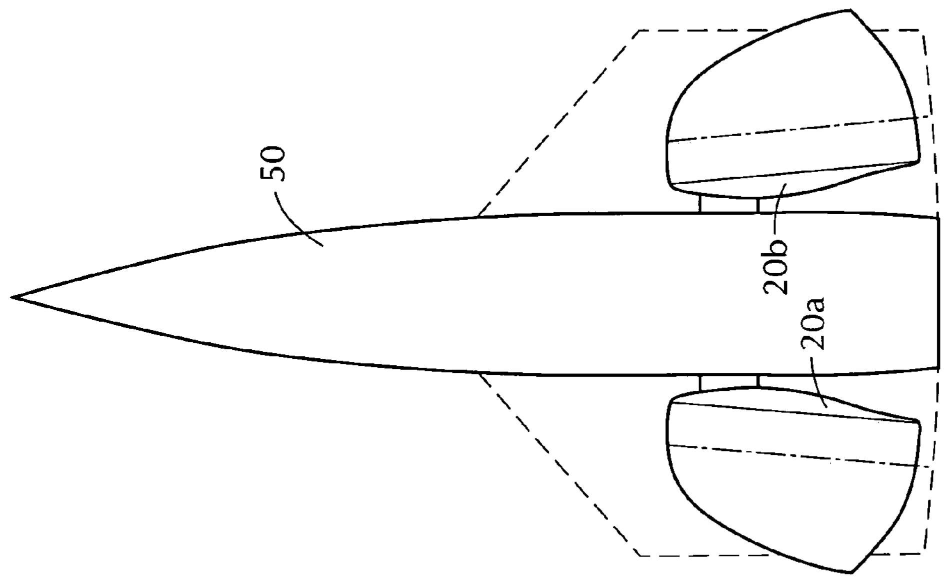
Figure 23:
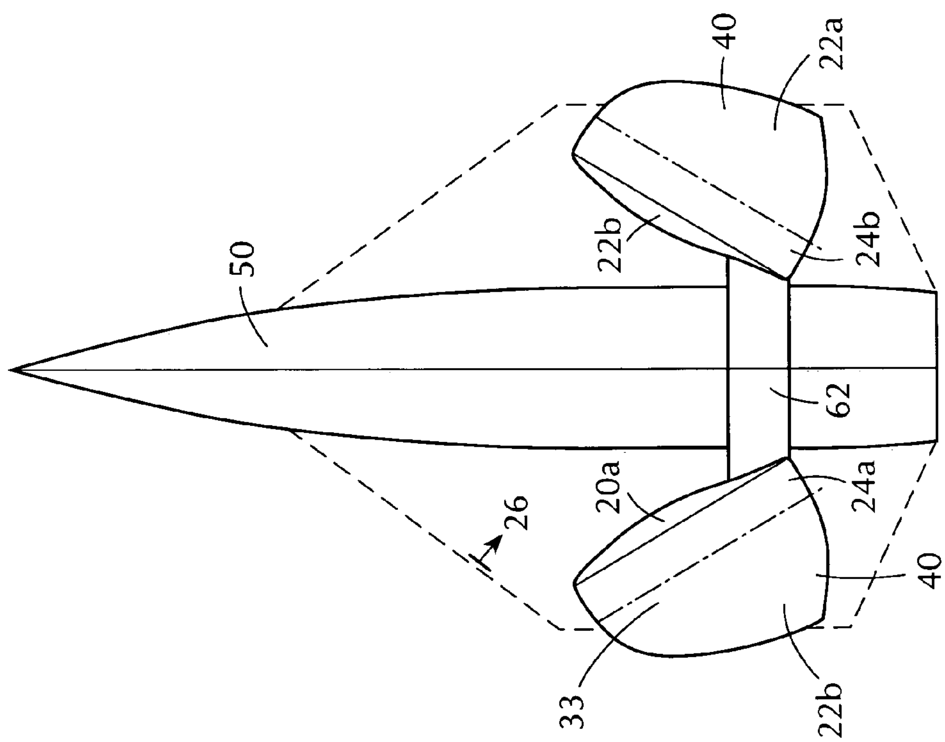
Figure 28B:
Figure 28A:
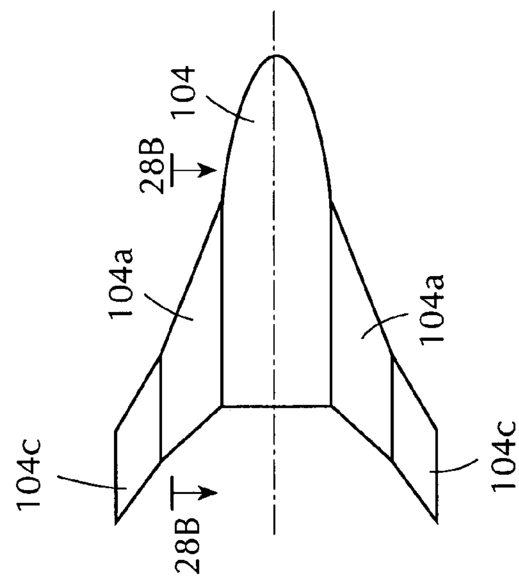
Figure 26B:
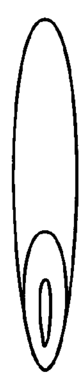
Figure 26A:
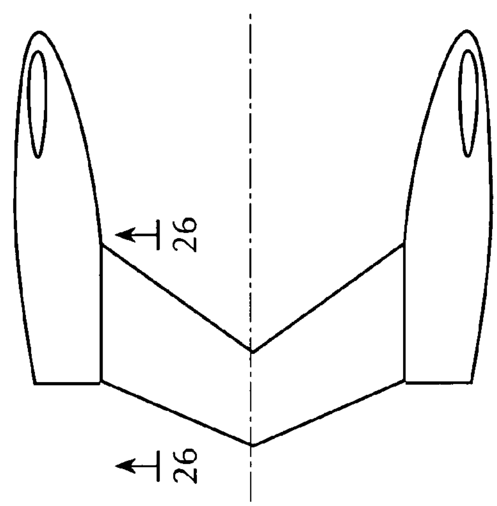
Figure 25B:
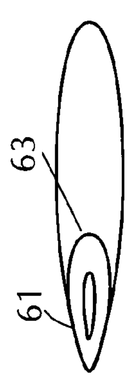
Figure 25A:
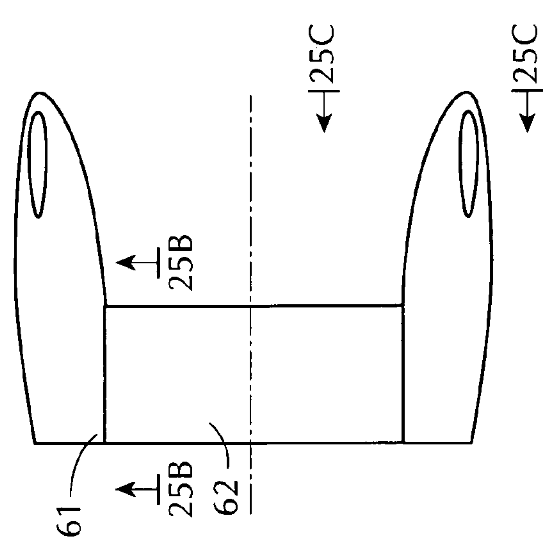
Figure 25C:
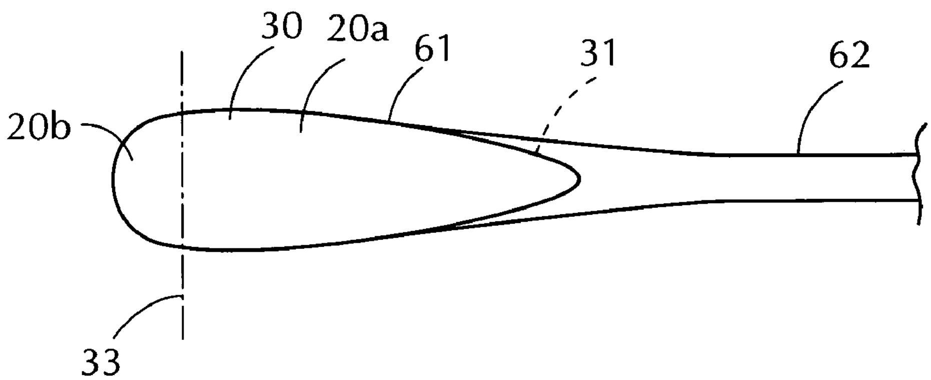
Figure 27:
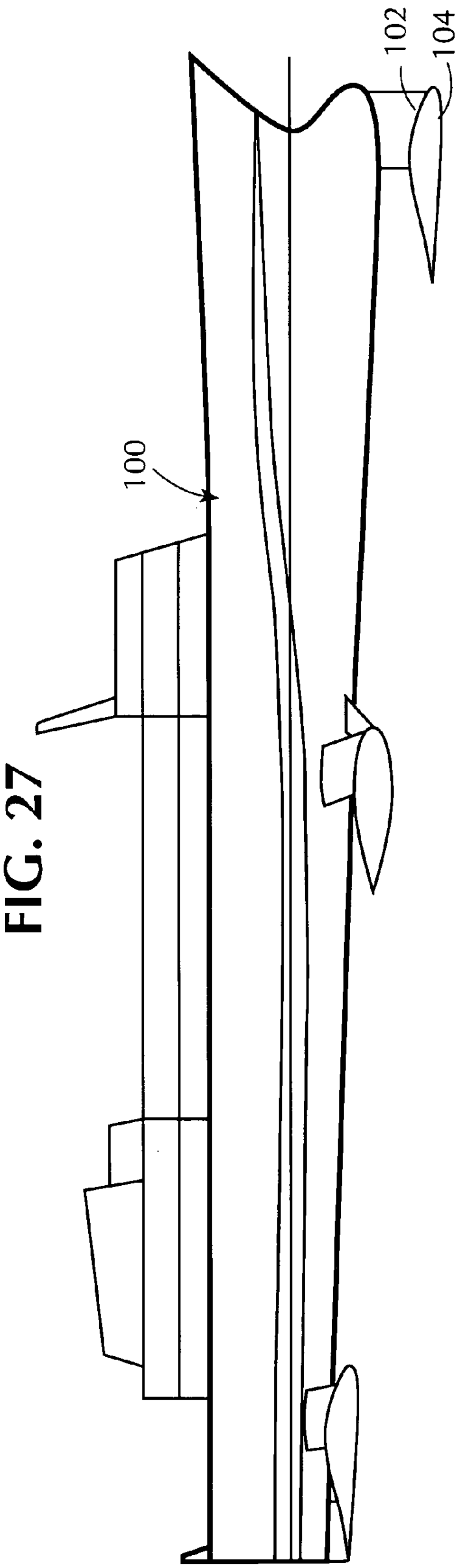
Figure 28:
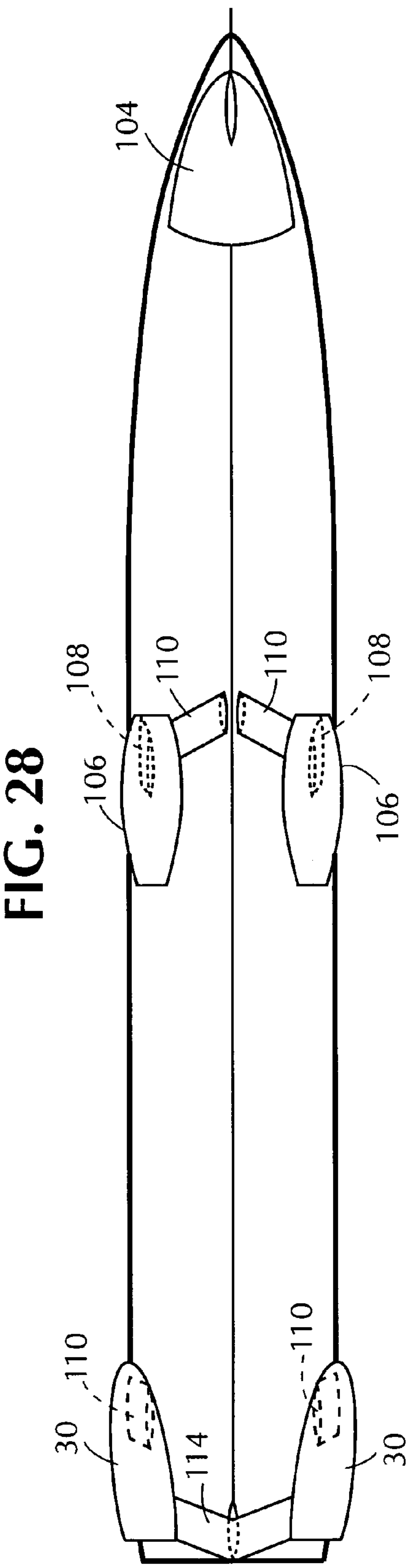

FIG. **19*a* is a front view of the embodiment of FIG. 19**;

FIG. 20 is a plan view of an asymmetric lifting body constructed in accordance with the present invention using the right and left halves of two lifting bodies as shown in FIG. 15 formed from different parabolic curves;

FIG. **20*a* is a front view of the embodiment of FIG. 20**;

FIGS. 21 and 22 are bottom plan views of a monohull watercraft including submerged lifting bodies constructed in accordance with the embodiment of FIG. 17 and respectively positioned with one or another of their asymmetric leading edge portions adjacent the hull of the vessel;

FIGS. 23 and 24 are bottom plan views similar to FIGS. 21 and 22 of a monohull watercraft including submerged lifting bodies constructed in accordance with the embodiment of FIG. 19 and positioned so that the lifting bodies generally diverge or converge in the fore direction from or toward the hull of the vessel;

FIG. 25*a* is a bottom plan view similar to FIG. 23 wherein the asymmetric hulls are connected to the vessel hull by a blended wing body juncture of the lifting body to the support foil;

FIG. 25*b* is a sectional view taken along line 25*b*—25*b* of FIG. 25;

FIG. 25*c* is a front view of the right lifting body shown in FIG. 25*a* taken along the line 25*c*—25*c* to illustrate how the foil blends into lifting body shape;

FIG. 26*a* is a view similar to FIG. 25*a* but illustrating a swept foil blended wing;

FIG. 26*b* is a sectional view taken along line 26—26 of FIG. 26*a*;

FIG. 27 is a profile view of a large ship constructed in accordance with an embodiment of the present invention;

FIG. 28 is a bottom view of the ship of FIG. 27;

FIG. 28*a* illustrates another form of a lifting body for use as the bow lifting body of the embodiment of FIG. 28 use in a blended wing and struts to connect it to the vessel's hull;

FIG. 28*b* is a sectional view taken along lines 28*b*—28*b* of FIG. 28*a;*

Figure 16:
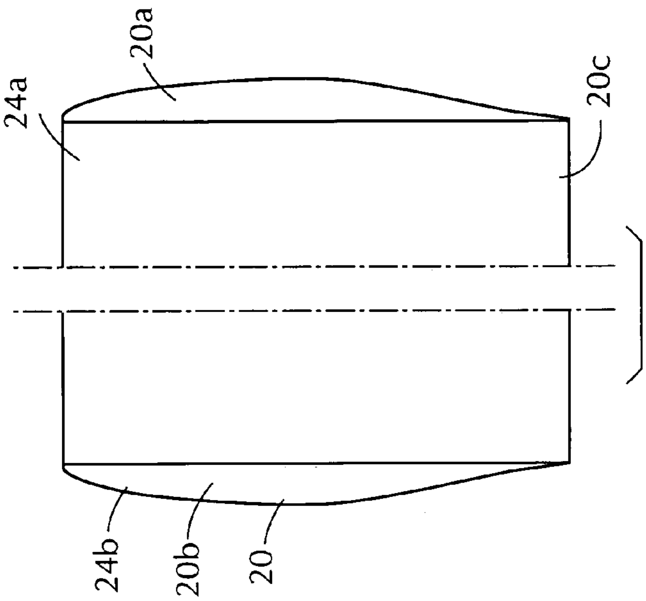
FIGS. 14, 15 and 16 are top views of the split lifting bodies shown in FIGS. 11–13.
Figure 33:
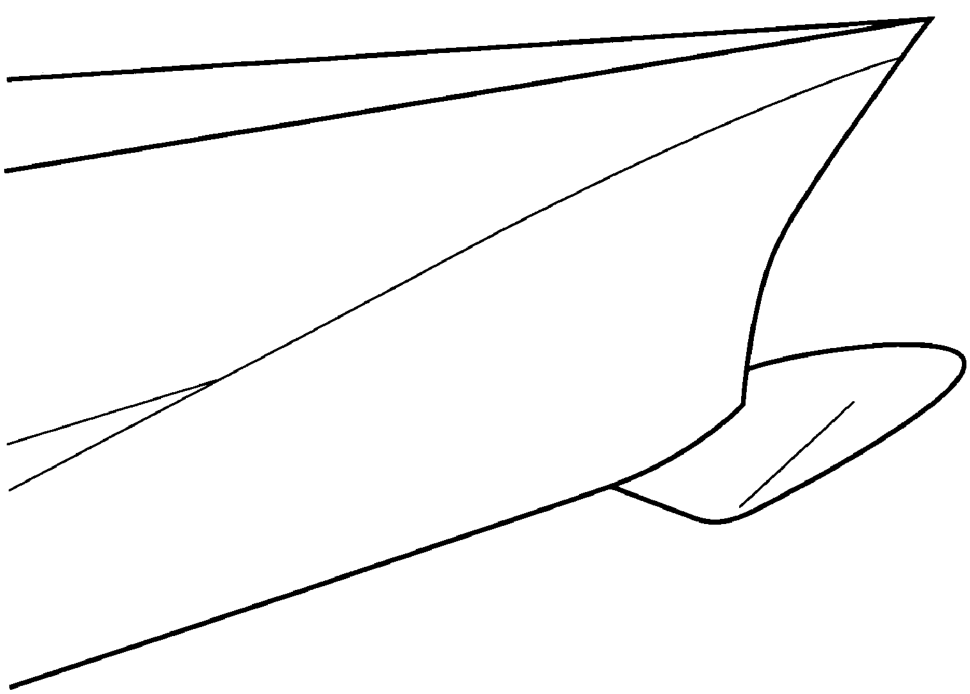
Figure 30:
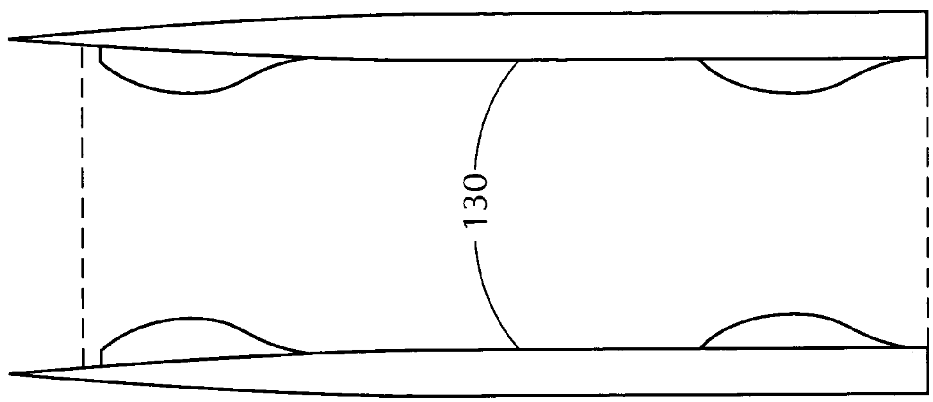
Figure 29:
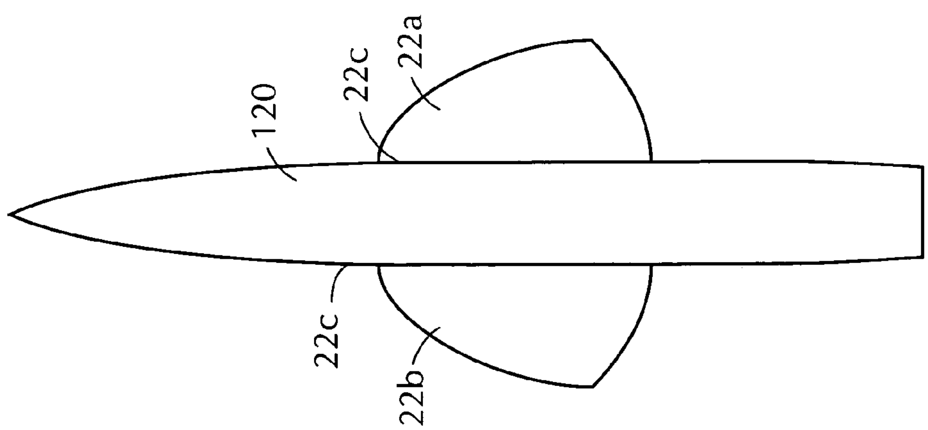
Figure 31:
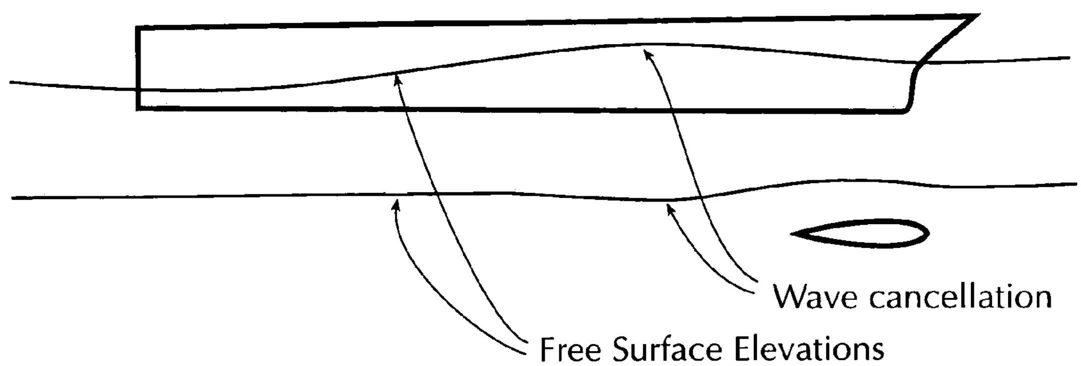
Figure 32:
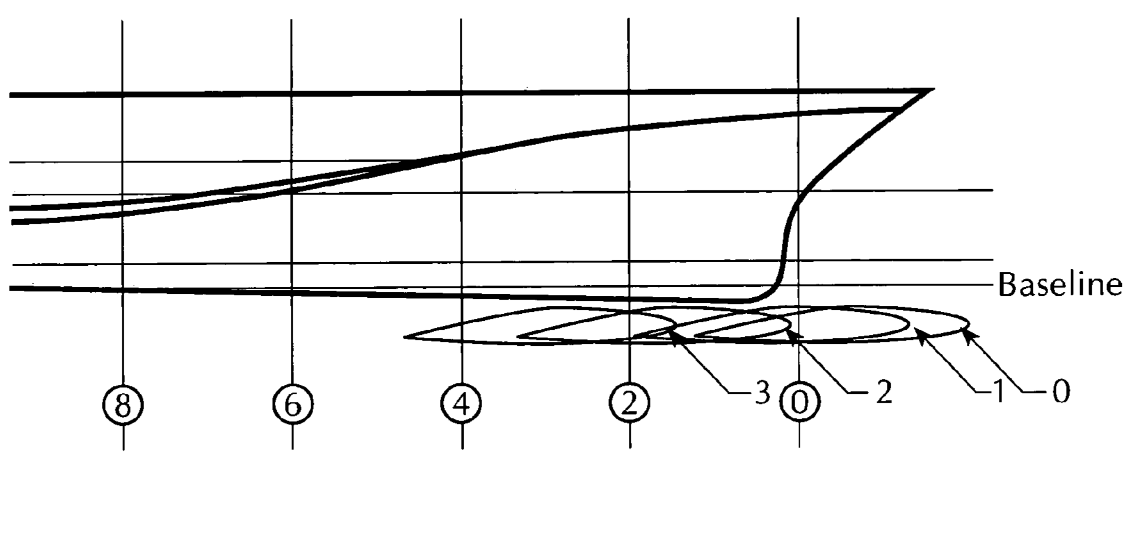

FIG. 29 is a view similar to FIG. 21 but showing the used asymmetric lifting bodies formed by the halves of the separated body of FIG. 15 secured directly to opposite sides of a monohull;

FIG. 30 is a view similar to FIG. 29 of a catamaran having asymmetric lifting bodies formed by the halves of the separated body of FIG. 16 secured directly to the insides of the hulls of the catamaran;

FIG. 31 is a schematic illustration of the surface wave forms created by a specific monohull and a lifting body located at the bow of the hull;

FIG. 32 is a schematic illustration showing specific possible locations for the lifting body relative to the hull;

FIG. 33 is a perspective view illustrating a direct correction of a lifting body to the bow of monohull.

DETAILED DESCRIPTION

Figure 1:
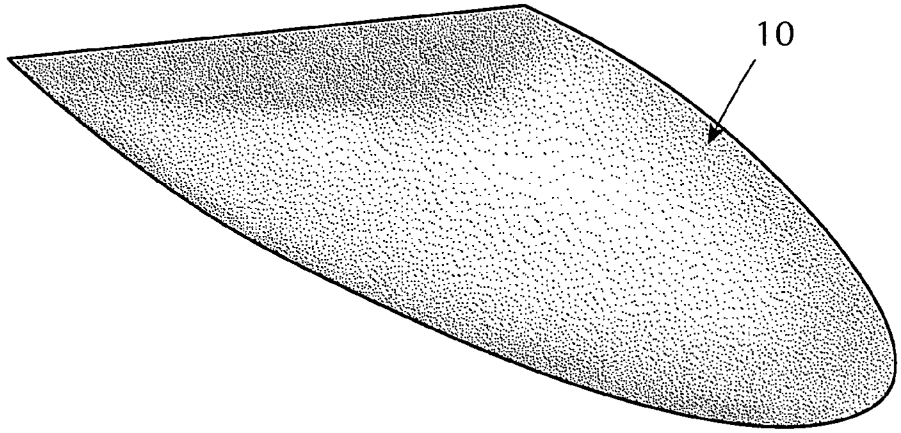
FIGS. 1, 2, 3 and 4 are perspective views of four forms of symmetrical lifting bodies as disclosed in U.S. Pat. No. 6,263,819.
Figure 1A:
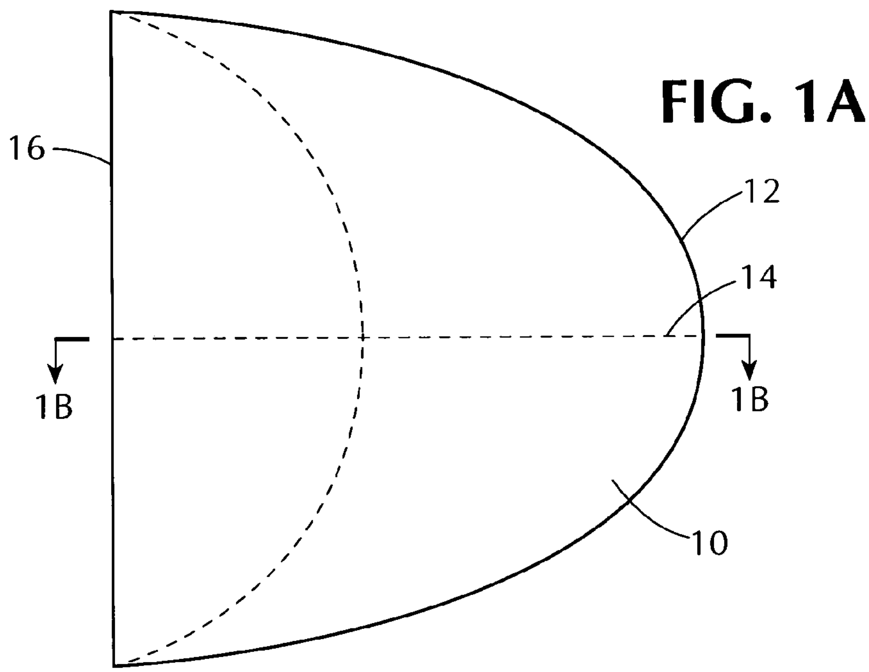
FIG. 1A is a schematic plan view of the embodiment of FIG. 1.

Referring now to the drawing in detail, FIG. 1 illustrates the basic hull form 10 of one embodiment of the invention described in U.S. Pat. No. 6,263,819, the disclosure of which is incorporated herein by reference. The lifting body hull 10 has a parabolic configuration in plan and a generally parabolic foil shape in longitudinal cross-section. This is illustrated more clearly in FIGS. 1A and 1B. As seen in FIG. 1A, hull 10 has a peripheral edge 12, also referred to herein as the leading edge of the hull, which defines the widest portion of the lifting body when viewed in plan. This edge is defined as a parabola substantially conforming to the conventional parabolic equation.

Figure 1B:
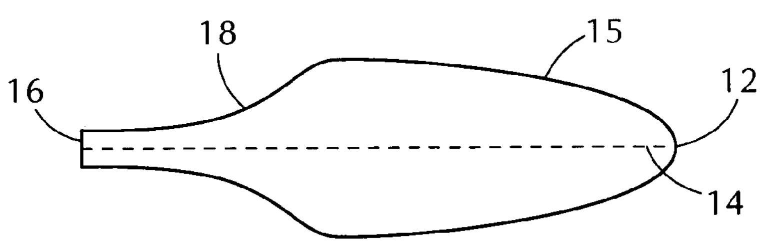
FIG. 1B is a cross-sectional view taken along line 1B—1B of FIG. 1A.

The shape of lifting body 10, in cross-section, is generally that of a parabola 15, as seen in FIG. 1B. The specific shape of the two parabolas 12 and 15 may vary generally as desired according to the size requirements of the vessel, and within certain ranges of length to thickness, and aspect ratios. And, the longitudinal parabolic cross-section may be cambered to improve pressure distribution on the hull surface. The cambering results in deviation of the hull surface from a perfect parabolic curve in cross-section. Cambering can be adjusted and modified based on design operating conditions and speed using a well known two dimensional foil design program named XFOIL created by MIT.

Lifting body 10 is symmetrical, and longitudinal cross-sections taken parallel to its fore and aft axis 14 are generally symmetrical to the parabolic foil shape defining the central cross-section shown in FIG. 1B, but the scale of each cross-section decreases generally uniformly away from the fore/aft axis so that the lifting body tapers towards the leading edge parabola 12. The vertices of the cross-sectional parabolic foil shapes lie on the peripheral edge 12 defined by the plan parabolic shape of the lifting body. The longitudinal cross-sectional shapes may be canted slightly-fore and aft as required to a desired angle of attack.

Lifting body 10 also includes a stern or rear edge 16 which, in the illustrative embodiment, is thin and straight. The parabolic foil curve 15 which defines the longitudinal cross-sectional shape of the lifting body extends from edge 12 towards the stern, as seen in FIG. 1B. However, along each longitudinal cross-section section of the lifting body, at approximately two-thirds of the length of the body from the cross-sections' vertex point on edge 12, the lifting body begins to taper towards the stern in an aft section 18. It has been found that this shape for the lifting body minimizes pressure drag and precludes cavitation in the speed ranges of operation of the vessels with which such lifting bodies are desirably used.

Figure 2:
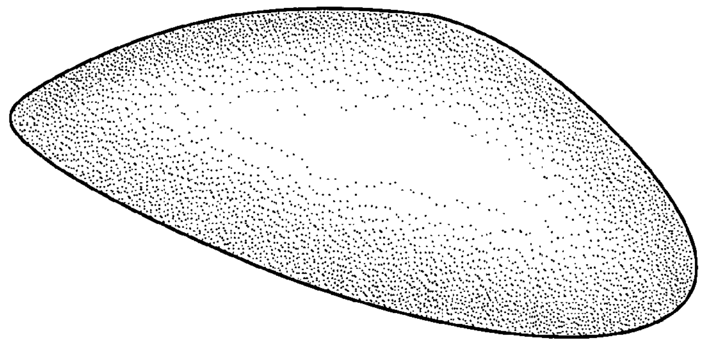
Figure 3:
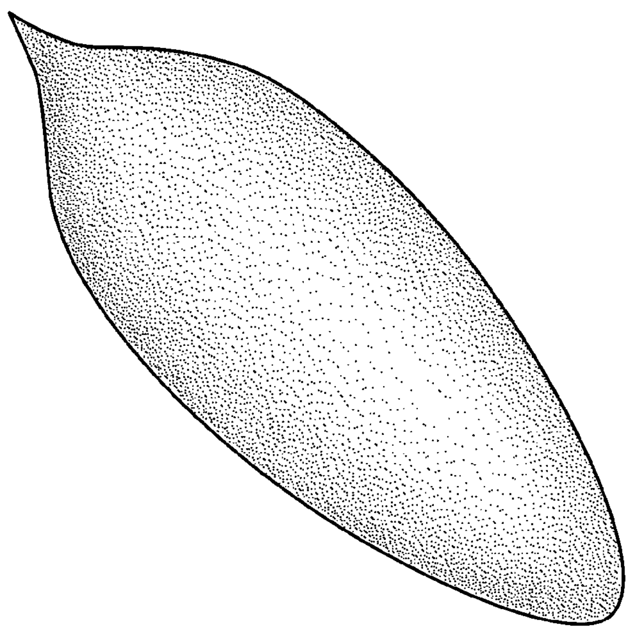
Figure 4:
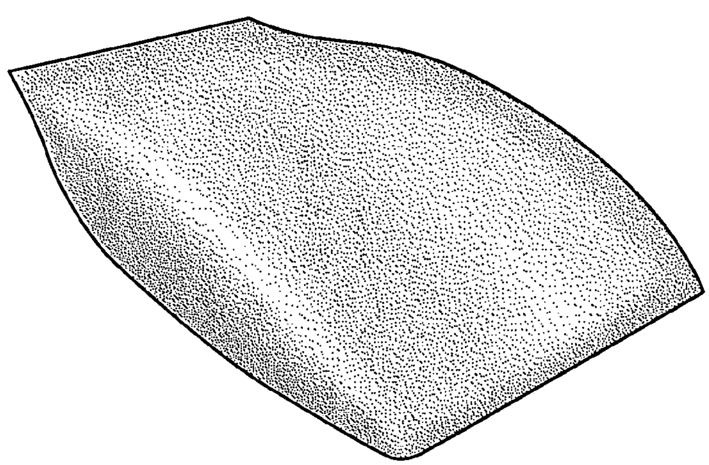
Figure 5:
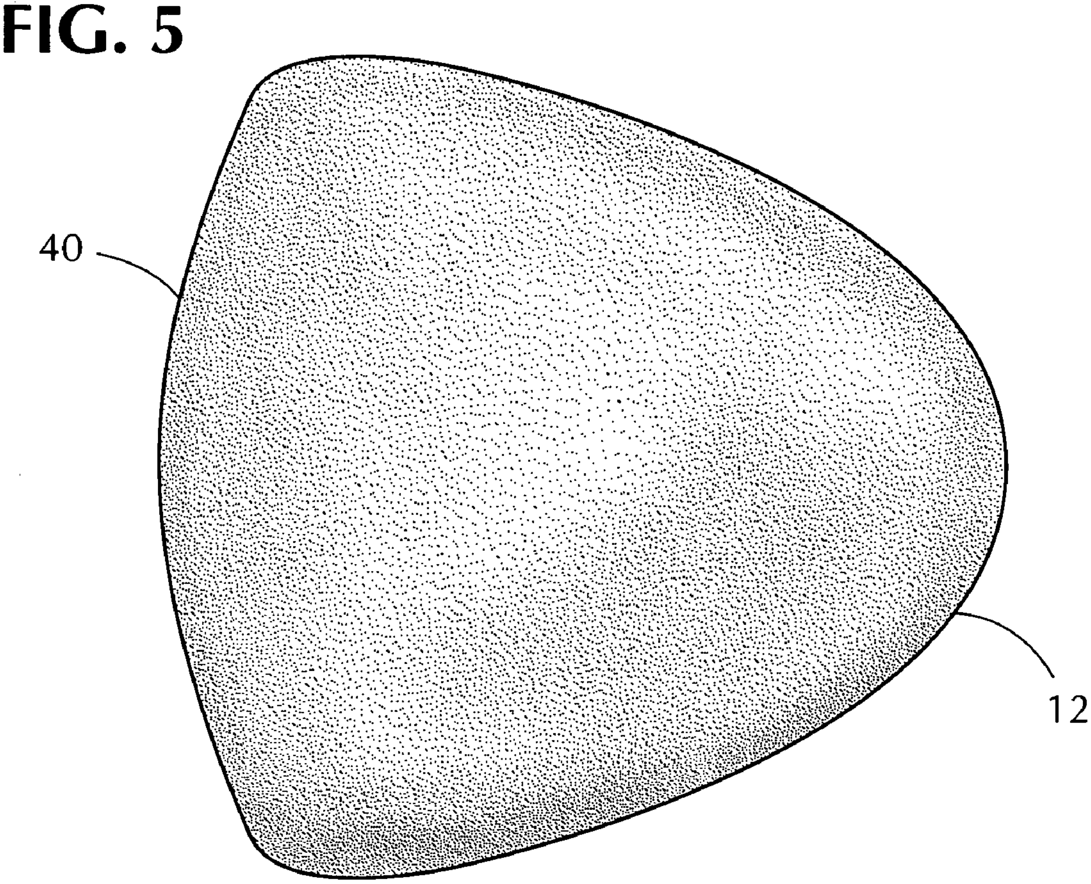
FIGS. 5 is a plan view of the embodiment of FIG. 2.

FIGS. 2, 5, 6 and 7 illustrate another embodiment of a lifting body according to the '819 patent constructed in accordance with the same principles previously described with respect to the embodiment of FIGS. 1–3. Here the stern 40 is formed as yet a third parabolic curve (in plan) which is fared at its ends into the leading edge parabolic curve 12 of the lifting body. This configuration further reduces the possibility of the formation of cavitation at the point of junction between the stern and the leading edge.

FIG. 3 shows another embodiment of the lifting body of the '819 patent, also formed by parabolic curves. In this embodiment the lifting body is formed as a body of revolution from a single parabola. However, as will be understood by those skilled in the art, when the lifting body is viewed in plan, it has a midpoint leading edge, similar to the edge 12 of the FIG. 1 embodiment which is defined about its equator and is in the shape of the same parabola. In addition, cross-sectional views of the lifting body parallel to its longitudinal axis will have a parabolic form with the leading edge of each parabola being on the midline parabolic curve 12. As with the embodiment of FIGS. 1–3, the aft section 18 of the hull is tapered towards the stern.

FIGS. 4 and 8 through 10 illustrate another embodiment of lifting body disclosed in the '819 patent which is formed, in principle, by designing a parabolic pod-type structure such as shown in FIG. 3 and then dividing the pod in half along its longitudinal axis. The pod's halves are then spaced apart a desired width and the central or longitudinal midships portion of the lifting body is formed with uniform parabolic cross-sections complementary to the parabolic longitudinal cross-section of the original pod shape. Thus, the lifting body is formed with parabolic longitudinal cross-sections across its width, but it also has a parabolic peripheral leading edge in plan, except for a straight central bow section which, in plan, includes the midhull section. The aft section of the hull is tapered, as described above, from about two-thirds of the length of the hull to the stern.

Figure 13:
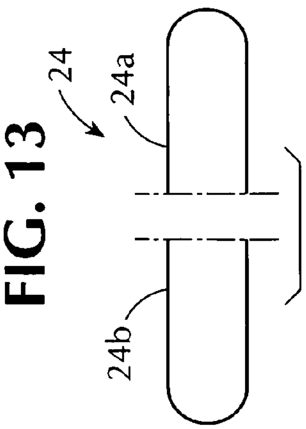
FIGS. 11–13 are front divided views of the embodiments of FIGS. 3, 5 and 4 respectively to aide in understanding the development of the asymmetric bodies of the present invention.
Figure 11:
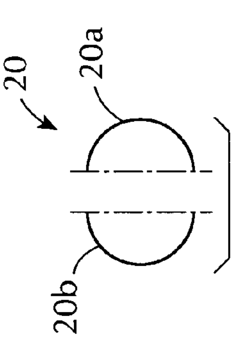
Figure 14:
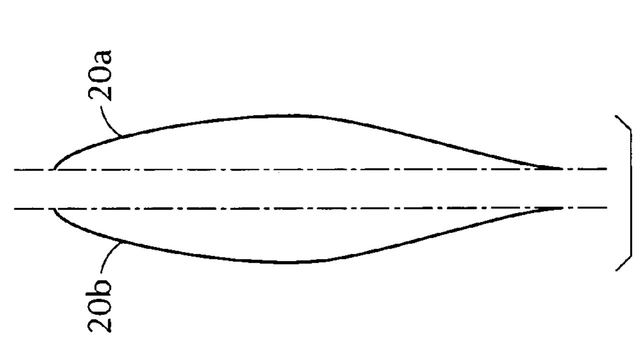

FIGS. 11–20 illustrate the manner in which the asymmetric lifting bodies of the present invention are developed. In particular, FIGS. 11 and 14 illustrate a parabolic body of resolution, i.e. a pod-like lifting body, constructed in accordance with the embodiment of FIG. 3 above. FIG. 11 shows a front view of the pod 20 and schematically illustrates the pod separated along its fore and aft axis into two pod sections, 20*a* and 20*b*. FIG. 14 illustrates the same two halves in plan view.

Figure 12:
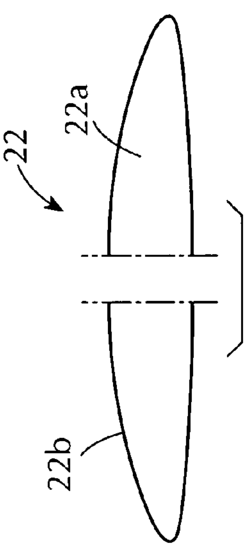

FIGS. 12 and 15 illustrate the lifting body of the embodiment of FIGS. 2, 5, 6 and 7. FIG. 12 is a front view showing the lifting body 22 separated along its centerline or fore and aft axis into two halves, 22*a* and 22*b*; FIG. 15 is a top plan view of that same structure.

FIGS. 13 and 16 depict the lifting body of FIGS. 4 and 8–10. FIG. 13 is a front view showing the lifting body 24 again cut in two halves along its longitudinal center line, to form the sections 24*a* and 24*b*. FIG. 16 is a top plan view of this same structure. As will be understood by those skilled in the art and from the description above of the embodiment of FIG. 7, the lifting body 24 of FIGS. 13 and 16 is formed from two halves of a body of revolution, i.e., the two halves 20*a* and 20*b* (illustrated in FIGS. 11 and 14) and a mid-ship section, 20*c* which is parabolic in longitudinal cross section, but with all of the planes through its width being of the same size.

The components illustrated in FIGS. 11–16 are assembled in accordance with the illustrations at FIGS. 17–20, to form the asymmetric lifting bodies of the present invention. In particular, referring to FIG. 17, an asymmetric lifting body 30 is formed from the lifting body segment 22*a* and the lifting body segment 20*b*. These are joined along their faces formed along the central fore and aft axes of their original lifting body shapes. Of course, the two segments are dimensioned so that at the plane where they join their parabolic shapes are identical. This plane is indicated by the dotted line 33 in FIGS. 17 and 18.

The lifting body 40 shown in FIGS. 19 and 19*a* is formed from the section 24*a* of the lifting body of FIG. 16 and the section 22*b* of the lifting body of FIG. 15. Here again the two sections or segments are joined along the line 33 which is defined by the respective central fore and aft axes of the original bodies. At that plane, the longitudinal cross sectional shapes of the two bodies are selected to be identical so that they mate with one another.

The lifting body 45 shown in FIGS. 20 and 20*a* is formed from the section 22*a* of the lifting body shown in FIG. 15 and section 22*b* made from a lifting body formed with a parabolic leading edge like that shown in the embodiment of FIG. 15 but using different parameters for its parabolic equation so that its width is narrower than that of the body shown in FIG. 15. Here again the two sections or segments are joined along the line 33 which is defined by the respective central fore and aft axes of the original bodies.

By creating asymmetric lifting bodies in this way, the lifting bodies 30, 40 and 45 maintain substantially all of the advantages of the lifting bodies described in the '819 patent, but in addition have greater flexibility in use, particularly in connection with monohull and catamaran structures of generally conventional construction. Because of the asymmetry of these lifting bodies, they can be positioned at varying angles of the attack with one or the other of their asymmetric sides adjacent the hull to conform to the flows generated by a particular hull beneath the water's surface. In addition, because they are somewhat narrower than the original lifting bodies from which they are formed, they can be conveniently placed close to the hulls, but outboard therefrom in order to produce dynamic control as a result of the increased dynamic moment the lifting bodies produce on the hull. This is shown, for example, in the views of FIGS. 21 and 22 wherein lifting bodies 30 constructed in accordance with FIG. 17 are shown supported below the hull of a monohull vessel, such as V hull or round bottom hull. The lifting bodies are supported directly from a deck structure 52 above the waterline of the hull, illustrated in dotted lines in these figures, with conventional struts or the like as disclosed, for example, in FIG. 33 of the '819 patent. However, in this case the struts and the lifting bodies are outboard of the central hull 50 of the monohull vessel, with the result that there is an increase in its roll stability and sea keeping ability.

In the embodiment of the invention illustrated in FIG. 21, lifting bodies 30 are mounted on the vessel so that the fore and aft axes of the lifting bodies (i.e. the axis 33 along which the halves of the two different hull shapes are joined) remain parallel to the fore and aft access of hull 50. However, because of the asymmetry of the lifting bodies and the fact that the sections 22*a* and 22*b* are located adjacent to or facing the sides of hull 50, the effective leading edge of the lifting bodies are divergent from one another.

In the embodiment of the ship 50 shown in FIG. 22, the lifting bodies 30 are inverted, from those of FIG. 21 so that the sides hereof which are formed by the bodies of revolution 20*a* and 20*b* are adjacent to hull 50, producing a somewhat narrower configuration. The exact positioning of the lifting bodies relative to the hull, and the edge thereof which is positioned facing the hull, may be varied to accommodate flow characteristics of the water under the vessel's hull as well as the wake forms created by the bow of the hull to minimize water head on the lifting bodies. Although in these embodiments of the invention the axes 33 of the lifting bodies are positioned parallel to the fore and aft axis of the hull 50, it is to be understood that these lifting bodies may be positioned so that their axes converge or diverge from each other.

In the embodiments illustrated in FIGS. 21 and 22, in addition to being supported by struts from the deck structure above the water surface, the asymmetric lifting bodies 30 are preferably joined to each other by a central cross foil 62 or are separately joined to the sides 64 of the vessel by foils 66. These foils can be conventional foil shaped or wing-like bodies. However, it has been found that better dynamic control and less turbulence is created if these foils are shaped as blended wings, such as are used in certain aircraft developed by Boeing and Wingco disclosed at their internet sites boeing.com/phantom and wingco.com/atlantica_bw-b.htm. In a blended wing body as disclosed therein, the foil of the wing joins the body along an elongated smooth curve with the wing having substantially the same as the thickness of the lifting body at their point of juncture. This is shown, for example, in FIG. 25*b* which is a sectional view through the foil 62 showing that the foil at its point of juncture 61 with the lifting body 30 has the same outer dimension and profile (except for its leading edge 63) as the peripheral surface of lifting body 30 to join the lifting body in a smooth transition from the surface of lifting body 30. The foil then tapers to a normal almost two dimensional shape as shown at the section line 25*b*—25*b*. FIG. 25*c* illustrates how the foil blends into the lifting body shape at the juncture 61.

FIGS. 26*a* and 26*b* are similar views to FIGS. 25*a* and 25*b*, but showing a swept foil shape of the blended wing.

The embodiments of the invention illustrated in FIGS. 23 and 24 are similar to that shown in FIGS. 21 and 22, except in these embodiments, lifting bodies 40 are used. In these embodiments, the surfaces of the body of revolution sections

20*a* and 20*b* are positioned to face the sides of the hull 50. Again, the bodies 40 are secured to the vessel by struts suspended from the above water line deck, but the lifting bodies are joined together by the foil 62 which preferably is connected as a blended wing structure as described above. The blended wing structure, because of the smooth transitions, create a forward vector which produces a suction action at the forward end of the lifting body that serves to counteract drag created by the presence of the body in the water. By positioning the asymmetric bodies as shown in FIGS. 22 and 24, the longer chords of the bodies are closer to hull 50 and each longitudinal section of the body moving away from the monohull will become smaller. This reduces the wave produced by the lifting body under water along the sections away from the hull. That in turn reduces the total head on the body which otherwise would counteract the lifting force of the lifting body. Finally, in this case the axes 33 at which the lifting body sections 22*b*, 24*a* and 22*a*, 24*b* are joined, are positioned to diverge or converge relative to each other, providing another degree of control over the effects caused by the lifting bodies.

It has been found that asymmetric lifting bodies constructed in accordance with the present invention are particularly suitable for very large vessels, typically above 2000 tons displacement. Smaller vessels are not particularly long in length and thus lifting bodies constructed in accordance with the '819 patent fit those smaller vessels better and have a tremendous impact on their performance ratios. Once vessels get larger than 2000 tons, the proportion of the length of the ship to the length of the lifting bodies becomes greater and the effect of the lifting body's practical size becomes less. However, the lifting bodies are still beneficial since they can replace other appendages on the vessel such as the propulsion pods and stabilizers, while still allowing the vessels to carry larger loads.

Using asymmetric lifting bodies constructed in accordance with the present invention on larger ships, significantly improves performance for their size relative to the size of the ship. They not only provide additional lift, they can be tailored and trimmed to reduce wave effects to the least resistance to passage of the vessel through the water with the best sea keeping characteristics. An example of such an effect occurs in monohull vessels which have sharp chines that are designed to reduce roll fitted with lifting bodies constructed in accordance with the present invention. In that case the lifting bodies can be formed to produce enough lift when the vessel is underway that the vessel is raised enough the chines come out of the water. As a result, the chines can be made larger to resist roll even more when the vessel is at rest, but when they are lifted out of the water there is less slamming of the vessel as it moves over the waves.

Figure 6:
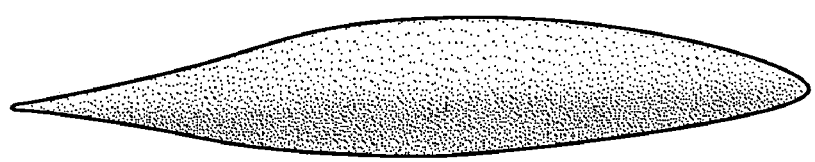
FIG. 6 is a side view of the embodiment of FIG. 2.
Figure 7:
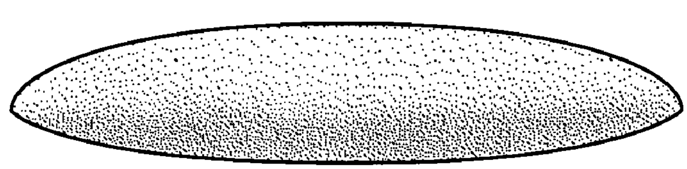
FIG. 7 is a front view of the embodiment of FIG. 2.
Figure 8:
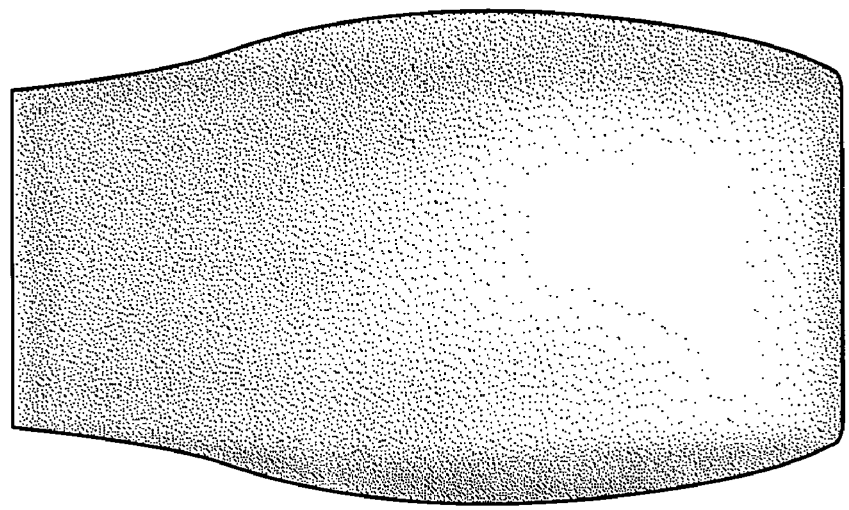
FIG. 8 is a plan view of the embodiment of FIG. 4.
Figure 9:
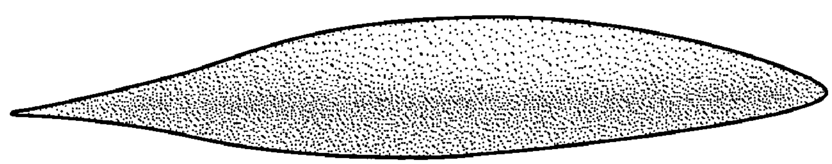
FIG. 9 is a side view of the embodiment of FIG. 4.
Figure 10:
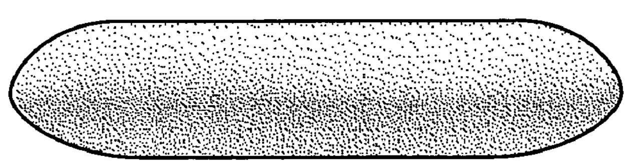
FIG. 10 is a front view of the embodiment of FIG. 4.

A large vessel 100, fitted with lifting bodies constructed in accordance with the present invention is shown in FIGS. 27 and 28. In this embodiment, vessel 100 includes a strut 102 depending from its bow which supports a lifting body 104 constructed in accordance with the lifting body illustrated in FIG. 5. A second pair of lifting bodies, constructed in accordance with the embodiments illustrated in FIG. 6 are mounted amidship to replace roll stabilizer fins. These lifting bodies are supported by struts 108 from the main hull, and are secured to the hull as well, near the keel 109, by cross foils 110. As described above, these cross foils can be of the blended wing variety.

Finally, at the aft of the vessel, a pair of lifting bodies 30, constructed in accordance with the embodiment of FIG. 17 as described above, are also provided. These are supported by struts 110 from hull 100 and are connected at their rear ends by a cross foil 114. This cross foil also may be of the blended wing variety. The asymmetry of the lifting bodies of the present invention used at the rear of this vessel can be tailored to the waves formed towards the rear of the large vessel's hull to minimize drag while substantially improving lift and increased capacity for the vessel.

Instead of connecting the bow lifting body to vessel 100 with a single strut, the lifting body can be connected by a blended wing arrangement as shown in FIGS. 28*a* and 28*b* wherein a pair of blended wings 104*a* are provided which terminate in small wing tip struts 104*b* connected to the hull of the vessel.

FIG. 29 illustrates yet another embodiment of the invention wherein a monohull vessel 120 is provided having asymmetric lifting body sections 22*a* and 22*b* secured along their sides 22*c* to the side of the vessel. These asymmetric bodies are not supported by struts or foils but provide material dynamic damping for the vessel.

FIG. 30 illustrates a plan view of a catamaran using asymmetric lifting bodies in accordance with FIGS. 11 and 14. In this case, one half of the bodies of revolution are secured to oppositely facing sides of the hulls 130 of the catamaran.

The shapes of the lifting bodies of the present invention result in minimal disturbance beyond their trailing edge through appendages, bodies or propulsers may be positioned behind them. These bodies displace the free surface in a manner which reduces the pressure coefficient on the body, allowing higher incipient cavitation speeds. Their dynamic lift can be varied as a function of camber, submergence, speed and angle of attack to optimize the lift characteristics for a given craft design speed. For motion control and stabilization, the dynamic lift of the bodies can be varied by the use of integrated trailing edge flaps.

Referring again to the vessel shown in FIGS. 27 and 28, a particular hull shape has been studied using a lifting body at the bow to demonstrate the improved efficiencies such a lifting body provides. More specifically, a so-called Serter monohull of 2000LT displacement was studied. While a number of foil shapes, aspect ratios and planform geometries were considered, the final shape produced was a lifting body measuring 48 ft long, 22 ft wide and 6 ft thick producing a total lift of 219 lton at three degrees, of the shape shown in FIG. 1. It was found that a lifting body applied to the bow of a ship introduces two positive attributes. The first is that the lifting body provides wave cancellation and reduces the overall drag, similar to the use of a bulbous bow, first discovered by D. W. Taylor.

FIG. 31 shows the concept of wave cancellation with the application of a lifting body. The upper and lower water lines illustrated in the Figure are free surface elevations. The top line is the wave pattern generated by the Serter hull alone at 40 knots. The bottom line is the wave pattern generated by the lifting body at 40 knots. The peak of the hull's bow wave coincides with the maximum trough generated by a lifting body. When the two wave patterns are joined, superposition of the two waves will cancel each other out and the resulting wave generated will have reduced amplitude and reduced wave drag associated with the entire system.

The second positive attribute is that a lifting body typically has a higher efficiency than that of a hull alone. By adding a component with a higher efficiency (lift to drag ratio, L/D) the L/D of the entire system increases. The inventors' studies have quantified these positive effects of adding a lifting body to the bow of a large ship using the method of computational fluid dynamics (CFD). To find the optimum location on the hull for placement of the lifting body relative to the bow, four different locations, as shown and numbered 0 through 3 were considered through a speed range of 30–50 knots, as shown in FIG. 31. In each case, the hull was free to heave to the desired displacement of 2000 lton and the trim was fixed at zero degrees. The studies conducted established that the 0 position shown in FIG. 31 was the most efficient. That position increased not only the lifting body's efficiency but that of the entire vessel itself. That position was found to be optimum for efficiency and maximum lift. In conducting the study, the angle of attack was also varied and it was found that a two degree angle of attack achieved maximum efficiency for the entire configuration. The lifting body was directly attached to the hull by any convenient manner by lining up the keel of the hull with the trailing edge of the body. The longitudinal location remained the same as Location 0 and the angle of attack is fixed at two degrees, as shown in FIG. 32.

Because the lifting body is intended to reduce the bow wave by wave cancellation and to elevate the hull and increase the overall efficiency, it is preferable that the area of low pressure on the upper surface of the lifting body not be interrupted by large struts or other appendages. By attaching the lifting body as shown in FIG. 32, the low pressure area of the lifting body is not disturbed and the overall lift and efficiency is not compromised. The reduced wave pattern produced by this arrangement generates a reduction in wave making drag, and therefore reduces the overall drag of the vessel.

It is known from previous studies that the Serter hull has a natural tendency to trim bow up over a speed range. By adding a lifting body in accordance with the present invention, the positive trimming moment will be increased and the resulting dynamic trim will also increase.

The maximum lift achieved by the lifting body while attached to the ship at 50 knots, two degrees, was determined to be 193 lton. Since the lifting body creates approximately 30,000 ft-lton trimming moment at 50 knots, the resulting dynamic trim of the vessel will be more than one degree.

To counteract this positive moment and achieve a level trim for best efficiency, a lifting hydrofoil or body should also be added somewhere aft of the ship's center of gravity, for example, as shown in FIG. 27. The purpose of this would be twofold:

1) balance the trimming moments of the hull and the lifting body 2) provide enough lift to achieve an optimum displacement for the hull It can be established that the point of maximum efficiency for this particular hull occurs at a displacement of 1600 lton. Since the lifting body tested provides 193 lton at 50 knots, it would be desirable to place a second lifting body or hydrofoil aft of the center of gravity to provide 207 lton lift, to produce the optimum 1600 lton lift on the hull for a total 2000 lton ship.

Integrating the lifting body at the bow and an aft foil or lifting body into the design of the ship allows the introduction of a motion control system such as control trailing edge flaps on the lifting body and aft foil. With the implementation of a control system motion damping can be affected withe benefits to added resistance in a sea way and crew effectiveness. With reduced motions speeds can be maintained and range is less affected by higher sea states. The lifting body of the bow and the aft foil individually add damping to the overall ship, but the addition of an active control system will substantially increase their benefits to ship operations.

It should be noted that the new configuration with the lifting body on the bow and aft foil is more efficient than the hull when each arrangement is free to trim as well when fixed at zero degrees. This proves that the drag reduction wasn't due to the trim of the hull but rather the addition of the lifting body bow used in conjunction with a transom foil.

Although illustrative embodiments of the present invention have been described herein with reference to the accompanying drawings, it is to be understood that various changes and modifications may be effected therein by those skilled in the art without departing from the scope or spirit of this invention.

What is claimed is:

1. A three dimensional low drag underwater lifting body for operation in a submerged state, said lifting body having a fore and aft axis and an outer surface whose shape conforms a) in plan on one side of said fore and aft axis to a first parabolic curve whose vertex is located on the fore and aft axis, and on the other side of said axis to a second different parabolic curve whose vertex is also located on the fore and aft axis; said parabolic curves together defining a leading edge for the lifting body when viewed in plan and b) in longitudinal cross-sectional planes parallel to the fore and aft axis, to symmetrical and graduated generally parabolic foil curves having vertices lying on the leading edge defined by said first and second parabolic curves and which extend aft predetermined distances, with the thickness of the parabolic foil shaped longitudinal cross-sectional planes decreasing from the fore and aft axis of the lifting body to the leading edge of the lifting body.

2. A low drag underwater lifting body as defined in claim 1 wherein the lifting body's beam, transversely of the fore and aft lifting body axis, is equal to or greater than its thickness perpendicular to the beam and fore and aft axis.

3. A low drag underwater lifting body as defined in claim 2 wherein said body has a predetermined length along said fore and aft axis and a stern portion defined by a segment of a third parabolic curve transverse to the lifting body's length on said one side of said axis.

4. A low drag underwater lifting body as defined in claim 3 wherein the substantially parabolic foil shape of the lifting body at each of said planes intersecting the lifting body parallel to the fore and aft is symmetrical to the shapes of the lifting body at the planes parallel thereto but each is smaller at positions further from the fore and aft axis of the lifting body.

5. A low drag underwater lifting body as defined in claim 2 wherein said body has a bow and a stern, a side periphery as viewed in plan, a predetermined length, and a stern section, said stern section having a progressively decreasing height dimension in cross-section parallel to the fore and aft axis of the lifting body from a point at each plane intersecting the lifting body parallel to the fore and aft axis which is about two-thirds of the length dimension from the intersection of such plane with said side periphery to the stern.

6. A low drag underwater lifting body as defined in claim 5 wherein said stern is defined by a segment of a third parabolic curve transverse to the length of the lifting body and located on one side of the fore and aft axis.

7. A low drag underwater lifting body as defined in claim 1 wherein the lifting body has port and starboard hull sections on opposite sides of said fore and aft axis and the hull section defined by said second parabolic curve is shaped as one half of a parabolic body of revolution.

8. A low drag underwater lifting body as defined in claim 2 wherein the maximum thickness of said lifting body is between 10% and 33% of the lifting body's length.

9. A low drag underwater lifting body as defined in claim 8 wherein the lifting body has an aspect ratio of 10% to 150%.

10. A watercraft as defined in claim 3 wherein the substantially parabolic foil shape of the lifting body at each of said planes intersecting the lifting body parallel to the fore and aft of the hull is symmetrical to the shapes of the lifting body at the planes parallel thereto but each is smaller at positions further from the fore and aft axis of the lifting body.

11. A three dimensional low drag underwater lifting body for operation in a submerged state, said lifting body having a fore and aft axis and an outer surface whose shape conforms a) in plan on one side of said axis to a first parabolic curve whose vertex is located on the fore and aft axis, and on the other side of said axis to a second different parabolic curve whose vertex is also located on the fore and aft axis; said parabolic curves together defining a leading edge for the hull when viewed in plan and b) in longitudinal cross-sectional planes parallel to the fore and aft axis, to symmetrical and graduated generally parabolic foil curves having vertices lying on the leading edge defined by said first and second parabolic curves and which extend aft predetermined distances, with the thickness of the parabolic foil shaped longitudinal cross-sectional planes decreasing from the fore and aft axis of the lifting body to the leading edge of the lifting body; said lifting body having a bow and a stern and a predetermined length extending from the bow to the stern, said first parabolic curve increasing in width from said bow to said stern with said stern being defined by a segment of a third parabolic curve transverse to the lifting body's length extending from the widest portion of the first parabolic curve to said axis.

12. A low drag underwater lifting body as defined in claim 11 wherein the lifting body's beam transversely of the fore and aft lifting body axis is equal to or greater than its thickness perpendicular to the beam and fore and aft axis.

13. A low drag underwater lifting body as defined in claim 12 wherein the substantially parabolic foil shape of the lifting body at each of said planes intersecting the lifting body parallel to the fore and aft axis is symmetrical to the shapes of the lifting body at the planes parallel thereto but each is smaller at positions further from the center line for and aft axis of the lifting body.

14. A low drag underwater hull as defined in claim 12 wherein the lifting body has port and starboard hull sections on opposite sides of said fore and aft axis and the hull section defined by said second parabolic curve being shaped as one half of a parabolic body of revolution.

15. A low drag underwater hull body as defined in claim 12 wherein said lifting body has a bow and a stern, a side periphery as viewed in plan, a predetermined length, and a stern section, said stern section having a progressively deceasing height dimension in cross-section parallel to the fore and aft axis of the lifting body from a point at each plane intersecting the lifting body parallel to the fore and aft axis which is about two-thirds of the length dimension from the intersection of such plane with said side periphery to the stern.

16. A low drag underwater lifting body as defined in claim 12 wherein the maximum thickness of said lifting body is between 10% and 33% of the lifting body's length.

17. A low drag underwater lifting body as defined in claim 16 wherein the lifting body has an aspect ratio of 10% to 150%.

18. A three dimensional low drag underwater lifting body for operation in a submerged state, said lifting body having a fore and aft axis and an outer surface whose shape is defined by a) a leading edge for the lifting body when viewed in plan and b) in longitudinal cross-section by symmetrical generally parabolic foil curves having vertices lying on the leading edge of the lifting body and lying in planes parallel to the fore and aft axis, said lifting body having first and second hull sections on opposite sides of said fore and aft axis and a midship section between said first and second hull sections and located to one side of said fore and aft axis, said first and second hull sections conforming in plan to first and second different parabolic curves whose vertexes are located on said leading edge on opposite sides of said midship section; the midship section having a parabolic foil shape in longitudinal cross-section which is uniform in planes parallel to the fore and aft axis between the first and second hull sections across the width thereof; and wherein the foil curves of said first and second hull sections decrease in thickness from the fore and aft axis of the lifting body to the edge thereof.

19. A low drag underwater lifting body as defined in claim 18 wherein the lifting body's beam transversely of the fore and aft hull axis is equal to or greater than its thickness perpendicular to the beam and fore and aft axis.

20. A low drag underwater lifting body as defined in claim 19 wherein said lifting body has a bow and a stern and a predetermined length along said fore and aft axis and a stern portion defined by a segment of a third parabolic curve transverse to the lifting body's length on the side of said axis opposite said midships section.

21. A low drag underwater lifting body as defined in claim 20 including a stern portion on said midships section which extends transversely to said fore and aft axis.

22. A low drag underwater lifting body as defined in claim 21 wherein the substantially parabolic foil shape of the lifting body in said first and second hull section at each of said planes parallel to the fore and aft planes is symmetrical to the shapes of the lifting body at the planes parallel thereto but each is smaller at positions further from the center line for and aft axis of the lifting body.

23. A low drag underwater lifting body as defined in claim 22 wherein the hull section on the side of the lifting body containing said midships section is shaped as one half of a parabolic body of revolution whose parabolic formula is the same as that of said midship section.

24. A low drag underwater lifting body as defined in claim 19 wherein said body has a bow and a stern, a side periphery as viewed in plan, a predetermined length, and a stern section, said stern section having a progressively deceasing height dimension in cross-section parallel to the fore and aft axis of the lifting body from a point at each plane intersecting the hull parallel to the fore and aft axis which is about two-thirds of the length dimension from the intersection of such plane with said side periphery to the stern.

25. A low drag underwater lifting body as defined in claim 24 wherein said stern is defined by a third parabolic curve transverse to the hull length on the side of said fore and aft axis opposite said midship section.

26. A low drag underwater lifting body as defined in claim 19 wherein the maximum thickness of said hull is between 10% and 33% of the hull length.

27. A low drag underwater lifting body as defined in claim 26 wherein the hull has an aspect ratio of 10% to 150%.

28. A watercraft including a first hull having a surface waterline, at least one strut depending from the first hull and a three-dimensional underwater submerged lifting body secured to said strut beneath the waterline during operation of the watercraft, said lifting body having a fore and aft axis and an outer surface whose shape conforms a) in plan on one side of said fore and aft axis to a first parabolic curve whose vertex is located on the fore and aft axis, and on the other side of said axis to a second different parabolic curve whose vertex is also located on the fore and aft axis; said parabolic curves together defining a leading edge for the hull when viewed in plan and b) in longitudinal cross-sectional planes parallel to the fore and aft axis, to symmetrical and graduated generally parabolic foil curves having vertices lying on the leading edge defined by said first and second parabolic curves and which extend aft predetermined distances, with the thickness of the parabolic foil shaped longitudinal cross-sectional planes decreasing from the fore and aft axis of the lifting body to the leading edge of the lifting body.

29. A watercraft as defined in claim 28 wherein the lifting body's beam, transversely of the fore and aft lifting body axis, is equal to or greater than its thickness perpendicular to the beam and fore and aft axis.

30. A watercraft as defined in claim 29 wherein said body has a predetermined length along said fore and aft axis and a stern portion defined by a segment of a third parabolic curve transverse to the lifting body's length on said one side of said axis.

31. A watercraft as defined in claim 30 wherein the substantially parabolic foil shape of the lifting body at each of said planes intersecting the lifting body parallel to the fore and aft axis is symmetrical to the shapes of the lifting body at the planes parallel thereto but each is smaller at positions further from the fore and aft axis of the lifting body.

32. A watercraft as defined in claim 29 wherein said body has a bow and a stern, a side periphery as viewed in plan, a predetermined length, and a stern section, said stern section having a progressively decreasing height dimension in cross-section parallel to the fore and aft axis of the lifting body from a point at each plane intersecting the lifting body parallel to the fore and aft axis which is about two-thirds of the length dimension from the intersection of such plane with said side periphery to the stern.

33. A watercraft as defined in claim 32 wherein said stern is defined by a segment of a third parabolic curve transverse to the length of the lifting body.

34. A watercraft as defined in claim 28 wherein the lifting body has port and starboard hull sections on opposite sides of said fore and aft axis and the hull section defined by said second parabolic curve is shaped as one half of a parabolic body of revolution.

35. A watercraft as defined in claim 28 wherein the maximum thickness of said lifting body is between 10% and 33% of the lifting body's length.

36. A watercraft as defined in claim 35 wherein the lifting body has an aspect ration of 10% to 150%.

37. A watercraft as defined in claim 28 including at least two struts depending from the first hull and a pair of said three dimensional underwater submerged lifting bodies respectively secured to said struts.

38. A watercraft as defined in claim 37 wherein the fore and aft axes of said lifting bodies diverge from each other toward the bow of the watercraft.

39. A watercraft as defined in claim 37 wherein the fore and aft axes of said lifting bodies converge toward each other in the direction of the bow of the watercraft.

40. A watercraft as defined in claim 38 including a foil shaped fin connecting said lifting bodies.

41. A watercraft as defined in claim 40 wherein said foil shaped fin is joined to said lifting bodies as a blended wing body wherein the thickness of the foil at its junctures with the lifting bodies is substantially the same as the thickness of the lifting bodies at said junctures.

42. A watercraft as defined in claim 38 wherein said watercraft has a bow and a stern, said lifting bodies being mounted in the rear portion of the ship forward of the stern.

43. A watercraft as defined in claim 42 including a three dimensional symmetrical low drag underwater lifting body mounted on the forward portion of the watercraft rearward of the bow.

44. A watercraft as defined in claim 42 including a second pair of lifting bodies mounted amidship of the watercraft.

45. A watercraft as defined in claim 42 wherein said watercraft is a monohull vessel with a fore and aft keel, said second pair of lifting bodies being respectively connected by cross foil support members to the hull of the watercraft adjacent said keel.

46. A watercraft as defined in claim 29 including a three dimensional symmetrical low drag underwater lifting body mounted on the forward position of the watercraft at the bow.

47. A watercraft as defined in claim 37 wherein said struts are foil shaped and each is joined to its associated lifting body as a blended wing body wherein the thickness of the foil at its junctures with the lifting body is substantially the same as the thickness of the lifting body at that juncture.

48. A watercraft as defined in claim 45 wherein said cross foil members are each joined to their associated lifting bodies as a blended wing body.

49. A watercraft as defined in claim 43 wherein the fore and aft axes of said lifting bodies diverge from each other toward the bow of the watercraft.

50. A watercraft as defined in claim 49 including a foil shaped fin connecting said lifting bodies.

51. A watercraft as defined in claim 50 having at least one hull having a surface waterline and a fore and aft axis, and a three dimensional low drag underwater lifting body secured to said hull beneath the waterline for operation in a submerged state, said lifting body having a first side, when viewed in plan, extending in the fore and aft direction relating to said hull and being secured to the hull, said lifting body having an outer wetted surface whose shape is defined by a) a leading edge for the lifting body when viewed in plan and b) in longitudinal cross-section by symmetrical generally parabolic foil curves having vertices lying on the leading edge of the lifting body and lying in planes parallel to the fore and aft axis, said lifting body having first and second sections, said first section conforming in plan to a segment of a first parabolic curve whose vertex is located at the fore of said leading edge; and said second section joined to said first section having a parabolic foil shape in longitudinal cross-section which is uniform in planes parallel to the fore and aft axis across the width thereof; said second section including said first side of the lifting body; and wherein the foil curves of said first section decrease in thickness along the width thereof to the edge thereof.

52. A watercraft as defined in claim 49 wherein said watercraft has a bow and a stern, said lifting bodies being mounted in the rear portion of the ship forward of the stern.

53. A watercraft as defined in claim 52 including a three dimensional symmetrical low drag underwater lifting body mounted on the forward portion of the watercraft rearward of the bow.

54. A watercraft as defined in claim 52 including a second pair of said lifting bodies mounted amidship of the watercraft.

55. A watercraft as defined in claim 54 wherein said watercraft is a monohull vessel with a fore and aft keel, said second pair of lifting bodies being respectively connected by cross foil support members to the hull of the watercraft adjacent said keel.

56. A watercraft as defined in claim 55 wherein the lifting body's beam transversely of the fore and aft axis of the hull is equal to or greater than its thickness perpendicular to the beam and fore and aft axis.

57. A watercraft including a first hull having a surface waterline, at least one strut depending from the first hull and a three-dimensional underwater submerged lifting body secured to said strut beneath the waterline during operation of the watercraft, said lifting body having a fore and aft axis and an outer surface whose shape conforms a) in plan on one side of said axis to a first parabolic curve whose vertex is located on the fore and aft axis, and on the other side of said axis to a second different parabolic curve whose vertex is also located on the fore and aft axis; said parabolic curves together defining a leading edge for the hull when viewed in plan and b) in longitudinal cross-sectional planes parallel to the fore and aft axis, to symmetrical and graduated generally parabolic foil curves having vertices lying on the leading edge defined by said first and second parabolic curves and which extend aft predetermined distances, with the thickness of the parabolic foil shaped longitudinal cross-sectional planes decreasing from the fore and aft axis of the lifting body to the leading edge of the lifting body; said lifting body having a bow and a stern and a predetermined length extending from the bow to the stern, said first parabolic curve increasing in width from said bow to said stern with said stern being defined by a segment of a third parabolic curve transverse to the lifting body's length and located at the widest portion of the first parabolic curve.

58. A watercraft as defined in claim 57 wherein the lifting body's beam transversely of the fore and aft lifting body axis is equal to or greater than its thickness perpendicular to the beam and fore and aft axis.

59. A watercraft as defined in claim 58 wherein the substantially parabolic foil shape of the lifting body at each of said planes intersecting the lifting body parallel to the fore and aft planes intersecting the lifting body parallel to the fore and aft axis is symmetrical to the shapes of the lifting body at the planes parallel thereto but each is smaller at positions further from the center line for and aft axis of the lifting body.

60. A watercraft as defined in claim 58 wherein said body has a bow and a stern, a side periphery as viewed in plan, a predetermined length, and a stern section, said stern section having a progressively decreasing height dimension in cross-section parallel to the fore and aft axis of the lifting body from a point at each plane intersecting the lifting body parallel to the fore and aft axis which is about two-thirds of the length dimension from the intersection of such plane with said side periphery to the stern.

61. A watercraft as defined in claim 60 wherein said stern is defined by a third parabolic curve transverse to the length of the lifting body.

62. A watercraft as defined in claim 58 wherein the maximum thickness of said lifting body is between 10% and 33% of the lifting body's length.

63. A watercraft as defined in claim 62 wherein the lifting body has an aspect ration of 10% to 150%.

64. A watercraft as defined in claim 60 including at least two struts depending from the first hull and a pair of said three dimensional underwater submerged lifting bodies respectively secured to said struts.

65. A watercraft as defined in claim 60 wherein the fore and aft axes of said lifting bodies converge toward each other in the direction of the bow of the watercraft.

66. A watercraft as defined in claim 61 wherein said foil shaped fin is joined to said lifting bodies as a blended wing body wherein the thickness of the foil at its junctures with the lifting bodies is substantially the same as the thickness of the lifting bodies at said junctures.

67. A watercraft as defined in claim 61 wherein said symmetrical low drag underwater lifting body has a bow and a stern position, the bow of said first hull being secured to the stern position of said symmetrical low drag lifting body.

68. A watercraft as defined in claim 60 wherein said stern is defined by a segment of a third parabolic curve transverse to the length of the lifting body.

69. A watercraft as defined in claim 68 wherein said foil shaped fin is joined to said lifting bodies as a blended wing body wherein the thickness of the foil at its junctures with the lifting bodies is substantially the same as the thickness of the lifting bodies at said junctures.

70. A watercraft including a monohull vessel having a surface waterline, a three dimensional underwater submerged lifting body secured to the bow of said monohull beneath the waterline during operation of the watercraft, said lifting body having a fore and aft axis and an outer surface whose shape conforms a) in plan on one side of said axis to a first parabolic curve whose vertex is located on the fore and aft axis, and on the other side of said axis to a second different parabolic curve whose vertex is also located on the fore and aft axis; said parabolic curves together defining a leading edge for the hull when viewed in plan and b) in longitudinal cross-sectional planes parallel to the fore and aft axis, to symmetrical and graduated generally parabolic foil curves having vertices lying on the leading edge defined by said first and second parabolic curves and which extend aft predetermined distances, with the thickness of the parabolic foil shaped longitudinal cross-sectional planes decreasing from the fore and aft axis of the lifting body to the leading edge of the lifting body; said lifting body having a bow and a stern and a predetermined length extending from the bow to the stern, said first parabolic curve increasing in width from said bow to said stern with said stern being defined by a segment of a third parabolic curve transverse to the lifting body's length and located at the widest portion of the first parabolic curve; wherein said stern of said lifting body being defined by a third parabolic curve transverse to the length of the lifting body; the maximum thickness of said lifting body is between 10% and 33% of the lifting body's length, and a stern lifting body secured to said monohull below the stern thereof.

71. A watercraft including a first hull having a surface waterline, at least one strut depending from the first hull and a three-dimensional underwater submerged lifting body secured to said strut beneath the waterline during operation of the watercraft, said lifting body having a fore and aft axis and an outer surface whose shape is defined by a) a leading edge for the lifting body when viewed in plan and b) in longitudinal cross-sectional by symmetrical generally parabolic foil curves having vertices lying on the leading edge of the lifting body and lying in planes parallel to the fore and aft axis, said lifting body having first and second hull sections on opposite sides of said fore and aft axis and a midship section between said first and second hull sections and located to one side of said fore and aft axis, said first and second hull sections conforming in plan to first and second different parabolic curves whose vertices are located on said leading edge on opposite sides of said midship section; the amidship section having a parabolic foil shape in longitudinal cross-section which is uniform in planes parallel to the fore and aft axis between the first and second hull sections across the width thereof; and wherein the foil curves of said first and second hull sections decrease in thickness from the fore and aft axis of the lifting body to the edge thereof.

72. A watercraft as defined in claim 71 wherein the lifting body's beam transversely of the fore and aft lifting body axis is equal to or greater than its thickness perpendicular to the beam and fore and aft axis.

73. A watercraft as defined in claim 72 wherein the substantially parabolic foil shape of the lifting body at each of said planes intersecting the lifting body parallel to the fore and aft planes are symmetrical to the shapes of the lifting body at the planes parallel thereto but each is smaller at positions further from the center line for and aft axis of the lifting body.

74. A watercraft as defined in claim 72 wherein said body has a bow and a stern, a side periphery as viewed in plan, a predetermined length, and a stern section, said stern section having a progressively decreasing height dimension in cross-section parallel to the fore and aft axis of the lifting body from a point at each plane intersecting the lifting body parallel to the fore and aft axis which is about two-thirds of the length dimension from the intersection of such plane with said side periphery to the stern.

75. A watercraft as defined in claim 72 wherein the maximum thickness of said lifting body is between 10% and 33% of the lifting body's length.

76. A watercraft as defined in claim 75 wherein the lifting body has an aspect ration of 10% to 150%.

77. A watercraft as defined in claim 74 including at least two struts depending from the first hull and a pair of said three dimensional underwater submerged lifting bodies respectively secured to said struts.

78. A watercraft as defined in claim 77 wherein the fore and aft axes of said lifting bodies diverge from each other toward the bow of the watercraft.

79. A watercraft as defined in claim 74 wherein the fore and aft axes of said lifting bodies converge toward each other in the direction of the bow of the watercraft.

80. A watercraft as defined in claim 78 including a foil shaped fin connecting said lifting bodies.

81. A watercraft as defined in claim 78 wherein said watercraft has a bow and a stern, said lifting bodies being mounted in the rear portion of the ship forward of the stern.

82. A watercraft as defined in claim 81 including a three dimensional symmetrical low drag underwater lifting body mounted on the forward portion of the watercraft rearward of the bow.

83. A watercraft as defined in claim 81 including a second pair of said lifting bodies mounted amidship of the watercraft.

84. A watercraft as defined in claim 83 wherein said watercraft is a monohull vessel with a fore and aft keel, said second pair of lifting bodies being respectively connected by cross foil support members to the hull of the watercraft adjacent said keel.

85. A watercraft as defined in claim 80 wherein the lifting body's beam transversely of the fore and aft axis of the hull is equal to or greater than its thickness perpendicular to the beam and fore and aft axis.

86. A watercraft as defined in claim 84 wherein the lifting body's beam transversely of the fore and aft axis of the hull is equal to or greater than its thickness perpendicular to the beam and fore and aft axis.

87. A watercraft having at least one hull having a surface waterline and a fore and aft axis and a three dimensional low drag underwater lifting body secured to said hull beneath the waterline for operation in a submerged state, said lifting body having a first side, when viewed in plan, extending in the fore and aft direction relative to said hull, said first side being secured directly to the hull, said lifting body having a leading edge and an outer wetted surface whose shape conforms a) in plan to a segment of a first parabolic curve whose vertex is located where the foremost part of the first side of the lifting body joins the hull and b) in longitudinal cross-sectional planes parallel to the fore and aft axis of the hull, to symmetrical and graduated generally parabolic foil curves having vertices lying on the leading edge of the lifting body and which extend aft predetermined distances, with the thickness of the parabolic foil shaped longitudinal cross-sectional planes decreasing from the first side of the lifting body to the leading edge of the lifting body.

88. A watercraft as defined in claim 87 wherein the lifting body's beam, transversely of the fore and aft axis of the hull, is equal to or greater than its thickness perpendicular to the beam and fore and aft axis.

89. A watercraft as defined in claim 88 wherein said body has a predetermined length in the fore and aft direction and a stern portion defined by a segment of a second parabolic curve transverse to the lifting body's length and extending from said hull.

90. A watercraft as defined in claim 88 wherein said lifting body has a bow and a stern, a side periphery as viewed in plan, a predetermined length, and a stern section, said stern section having a progressively decreasing height dimension in cross-section parallel to the fore and aft axis of the hull from a point at each plane intersecting the lifting body parallel to the fore and aft axis which is about two-thirds of the length dimension from the intersection of such plane with said side periphery to the stern.

91. A watercraft as defined in claim 90 wherein said stern is defined by a segment of a second parabolic curve transverse to the length of the lifting body and extending from said hull.

92. A watercraft as defined in claim 88 wherein the maximum thickness of said lifting body is between 10% and 33% of the lifting body's length.

93. A watercraft as defined in claim 92 wherein the lifting body has an aspect ratio of 10% to 150%.

94. A watercraft as defined in claim 87 including a pair of said lifting bodies secured on opposite sides of said hull along their respective first sides.

95. A watercraft as defined in claim 87 including a pair of laterally spaced parallel hulls having surface water lines and fore and aft axes, and at least one pair of said lifting bodies secured respectively to said hulls along their respective first sides and extending towards each other.

96. A watercraft as defined in claim 95 wherein said lifting bodies are each shaped as one half of a parabolic body of revolution.

97. A watercraft having at least one hull having a surface waterline and a fore and aft axis, and a three dimensional low drag underwater lifting body secured to said hull beneath the waterline for operation in a submerged state, said lifting body having a first side, when viewed in plan, extending in the fore and aft direction relative to said hull, said first side being secured to the hull, said lifting body having an outer wetted surface whose shape is defined by a) a leading edge for the lifting body when viewed in plan and b) in longitudinal cross-section by symmetrical generally parabolic foil curves having vertices lying on the leading edge of the lifting body and lying in planes parallel to the fore and aft axis, said lifting body having first and second sections, said first section conforming in plan to a segment of a first parabolic curve whose vertex is located at the fore of said leading edge; and said second section joined to said first section having a parabolic foil shape in longitudinal cross-section which is uniform in planes parallel to the fore and aft axis across the width thereof; said second section including said first side of the lifting body secured to the hull; and wherein the foil curves of said first section decrease in thickness along the width thereof to the edge thereof.

98. A watercraft as defined in claim 97 wherein the lifting body's beam transversely of the fore and aft axis of the hull is equal to or greater than its thickness perpendicular to the beam and fore and aft axis.

99. A watercraft as defined in claim 98 including a stern portion on said second section of the lifting body which extends transversely to said fore and aft axis.

100. A watercraft as defined in claim 99 wherein the first section of the lifting body is shaped as one half of a parabolic body of revolution whose parabolic formula.

101. A watercraft as defined in claim 98 wherein said lifting body has a bow and a stern, a side periphery as viewed in plan, a predetermined length, and a stern section, said stern section having a progressively deceasing height dimension in cross-section parallel to the fore and aft axis of the lifting body from a point at each plane intersecting the lifting body parallel to the fore and aft axis which is about two-thirds of the length dimension from the intersection of such plane with said side periphery to the stern.

* * * * *